United States Patent
Hayashi et al.

(10) Patent No.: US 10,545,812 B2
(45) Date of Patent: Jan. 28, 2020

(54) INFORMATION PROCESSING SYSTEM, INFORMATION PROCESSING APPARATUS, AND MEDIUM

(71) Applicants: Shunsuke Hayashi, Kanagawa (JP); Satoshi Mizuno, Tokyo (JP); Takenori Oku, Kanagawa (JP)

(72) Inventors: Shunsuke Hayashi, Kanagawa (JP); Satoshi Mizuno, Tokyo (JP); Takenori Oku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 15/830,295

(22) Filed: Dec. 4, 2017

(65) Prior Publication Data

US 2018/0165143 A1 Jun. 14, 2018

(30) Foreign Application Priority Data

Dec. 9, 2016 (JP) ................................ 2016-239770

(51) Int. Cl.
*G06F 11/00* (2006.01)
*G06F 11/07* (2006.01)

(52) U.S. Cl.
CPC ........ *G06F 11/079* (2013.01); *G06F 11/0736* (2013.01); *G06F 11/0751* (2013.01); *G06F 11/0787* (2013.01)

(58) Field of Classification Search
CPC .. G06F 11/07; G06F 11/0736; G06F 11/0751; G06F 11/0787; G06F 11/079; G06Q 50/10
See application file for complete search history.

(56) References Cited

U.S. PATENT DOCUMENTS

| | | | |
|---|---|---|---|
| 2004/0246520 A1* | 12/2004 | Obert | G03G 15/55 358/1.15 |
| 2008/0215927 A1* | 9/2008 | Roussel | G06F 11/0715 714/47.1 |
| 2008/0246987 A1* | 10/2008 | Scrafford | G06F 11/008 358/1.15 |
| 2009/0249117 A1* | 10/2009 | Horikoshi | G06F 11/0727 714/6.12 |
| 2013/0019128 A1* | 1/2013 | Yamasaki | G06F 11/0733 714/45 |

(Continued)

FOREIGN PATENT DOCUMENTS

| | | |
|---|---|---|
| JP | H10-74108 | 3/1998 |
| JP | 2004-322862 | 11/2004 |
| JP | 2016-071871 | 5/2016 |

*Primary Examiner* — Joshua P Lottich
(74) *Attorney, Agent, or Firm* — IPUSA, PLLC

(57) ABSTRACT

An information processing apparatus includes a first storage device configured to store device data output regularly or non-regularly from a device connected to the information processing apparatus; a second storage device configured to store maintenance report data related to maintenance work performed on the device; and a processor. The processor is configured to evaluate whether the device on which the maintenance work was performed operates normally, based on the device data stored in the first storage device, and the maintenance report data stored in the second storage device, to generate an evaluation result; and send a notice of the evaluation result, to a terminal device connected to the information processing apparatus.

8 Claims, 25 Drawing Sheets

(56) References Cited

U.S. PATENT DOCUMENTS

| | | | |
|---|---|---|---|
| 2013/0124926 A1* | 5/2013 | Cowie | G06F 11/0736 |
| | | | 714/45 |
| 2016/0092848 A1 | 3/2016 | Nakajima et al. | |
| 2016/0378584 A1 | 12/2016 | Oku et al. | |
| 2016/0379144 A1 | 12/2016 | Mizuno et al. | |
| 2017/0230521 A1 | 8/2017 | Hayashi et al. | |

* cited by examiner

FIG.6

| DEVICE ID | DATE AND TIME | MODEL | ITEM 1 (SENSOR VALUE) | ITEM 2 (ERROR CONTENT) | ITEM 3 (COUNTER VALUE) | ... |
|---|---|---|---|---|---|---|
| A001 | 2016/1/9 4:00 | X001 | ... | ... | ... | ... |
| A001 | 2016/1/8 4:01 | X001 | ... | ... | ... | ... |
| A001 | 2016/1/7 3:59 | X001 | ... | ... | ... | ... |
| ... | ... | ... | ... | ... | ... | ... |
| A002 | 2016/1/9 4:11 | X002 | ... | ... | ... | ... |
| A002 | 2016/1/8 4:10 | X002 | ... | ... | ... | ... |
| A002 | 2016/1/7 4:09 | X002 | ... | ... | ... | ... |
| ... | ... | ... | ... | ... | ... | ... |

110

110D (bracket over ITEM 3 column)

| MAINTENANCE ID | WORKDAY | MAINTENANCE WORKER ID | DEVICE ID | MODEL | ERROR CONTENT | WORK CONTENT | INTERMEDIATE EVALUATION FLAG — 120D |
|---|---|---|---|---|---|---|---|
| M001 | 2016/1/10 | CE001 | A001 | X001 | EC001 (PAPER JAM OCCURRED) | PAPER JAM REMOVED PAPER FEEDING GUIDANCE | 0 (INTERMEDIATE EVALUATION NOT REQUIRED) |
| M002 | 2016/1/11 | CE002 | A002 | X002 | EC002 (ABNORMAL SENSOR VALUE OF COMPONENT C) | COMPONENT C CLEANED | 1 (INTERMEDIATE EVALUATION REQUIRED) |
| M003 | 2016/1/12 | CE001 | A003 | X001 | EC001 (PAPER JAM OCCURRED) | PAPER JAM REMOVED PAPER FEEDING GUIDANCE | 0 (INTERMEDIATE EVALUATION NOT REQUIRED) |
| M004 | 2016/1/13 | CE002 | A004 | X003 | EC004 (ABNORMAL SENSOR VALUE OF COMPONENT A) | COMPONENT A REPLACED | 1 (INTERMEDIATE EVALUATION REQUIRED) |
| M005 | 2016/1/13 | CE003 | A005 | X001 | EC003 (SOME FAULT) | COMPONENT B REPLACED | 1 (INTERMEDIATE EVALUATION REQUIRED) |
| ... | ... | ... | ... | ... | ... | ... | ... |

MAINTENANCE ID: M001 (WORKDAY: 2016/1/11)

MAINTENANCE ID: M001 (WORKDAY: 2016/1/10)

| INTERMEDIATE EVALUATION DATE | ERROR CONTENT | WORK CONTENT | INTERMEDIATE EVALUATION |
|---|---|---|---|
| 2016/1/11 | EC001 (PAPER JAM OCCURRED) | PAPER JAM REMOVED PAPER FEEDING GUIDANCE | NO ABNORMALITY |
| 2016/1/12 | EC001 (PAPER JAM OCCURRED) | PAPER JAM REMOVED PAPER FEEDING GUIDANCE | NO ABNORMALITY |
| 2016/1/13 | EC001 (PAPER JAM OCCURRED) | PAPER JAM REMOVED PAPER FEEDING GUIDANCE | NO ABNORMALITY |
| 2016/1/14 | EC001 (PAPER JAM OCCURRED) | PAPER JAM REMOVED PAPER FEEDING GUIDANCE | NO ABNORMALITY |
| 2016/1/15 | EC001 (PAPER JAM OCCURRED) | PAPER JAM REMOVED PAPER FEEDING GUIDANCE | NO ABNORMALITY |
| ... | ... | ... | ... |

| MAINTENANCE ID | WORKDAY | MAINTENANCE EVALUATION DATE | MAINTENANCE WORKER ID | DEVICE ID | MODEL | ERROR CONTENT | WORK CONTENT | MAINTENANCE EVALUATION |
|---|---|---|---|---|---|---|---|---|
| M001 | 2016/1/10 | 2016/1/20 | CE001 | A001 | X001 | EC001 (PAPER JAM OCCURRED) | PAPER JAM REMOVED PAPER FEEDING GUIDANCE | NO ABNORMALITY |
| M002 | 2016/1/11 | 2016/1/12 | CE002 | A002 | X002 | EC002 (ABNORMAL SENSOR VALUE OF COMPONENT C) | COMPONENT C CLEANED | ABNORMALITY FOUND (EC002) |
| M003 | 2016/1/12 | 2016/1/22 | CE001 | A003 | X001 | EC001 (PAPER JAM OCCURRED) | PAPER JAM REMOVED PAPER FEEDING GUIDANCE | NO ABNORMALITY |
| ⋮ | ⋮ | ⋮ | ⋮ | ⋮ | ⋮ | ⋮ | ⋮ | ⋮ |

| MAINTENANCE WORKER ID | MAINTENANCE EVALUATION COUNT OF "NO ABNORMALITY" | MAINTENANCE EVALUATION COUNT OF "ABNORMALITY FOUND" | DESTINATION OF NOTICE OF MAINTENANCE EVALUATION |
|---|---|---|---|
| CE001 | 20 | 1 | WORKER |
| CE002 | 10 | 0 | WORKER |
| CE003 | 2 | 4 | WORKER AND SUPERVISOR (CE001) |
| CE004 | 15 | 1 | WORKER AND SUPERVISOR (CE001) |
| CE005 | 12 | 0 | WORKER |
| ... | ... | ... | ... |

150D (covers the "DESTINATION OF NOTICE OF MAINTENANCE EVALUATION" column)

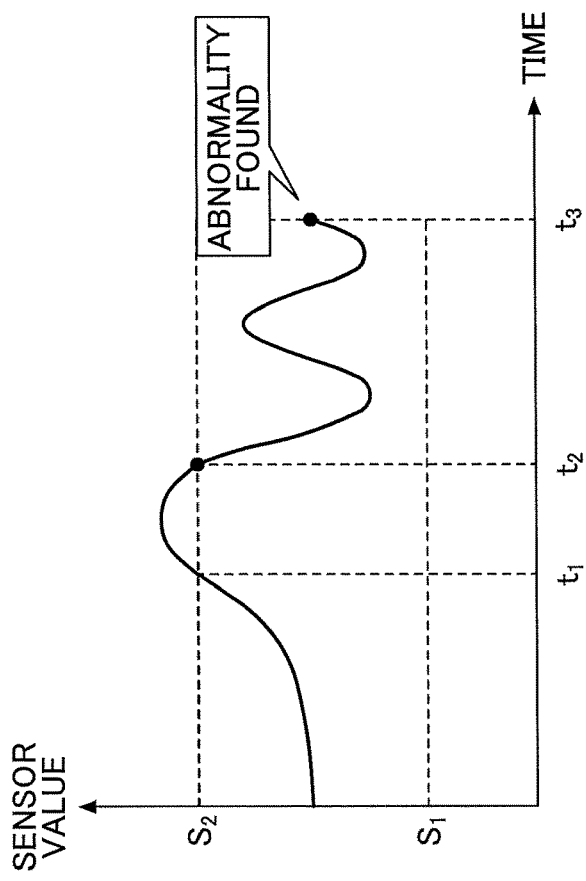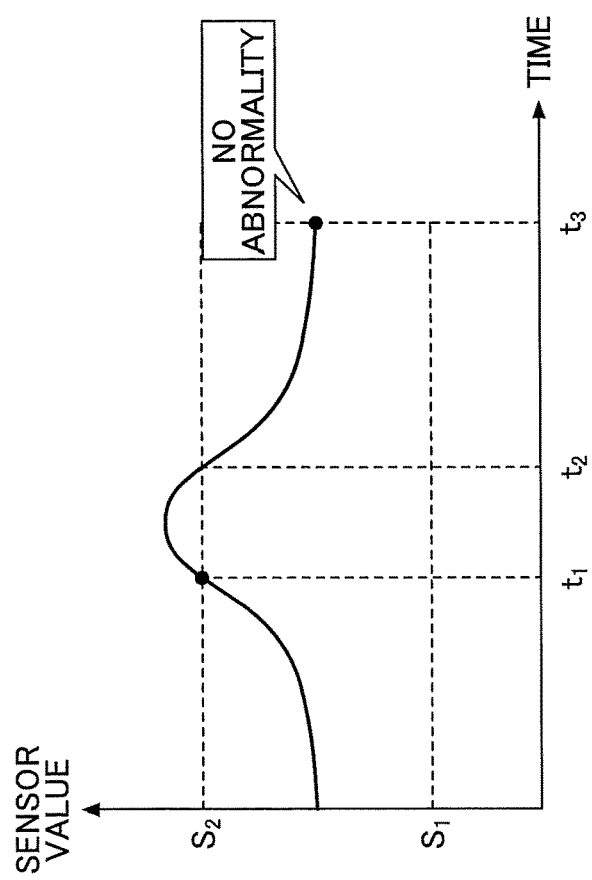

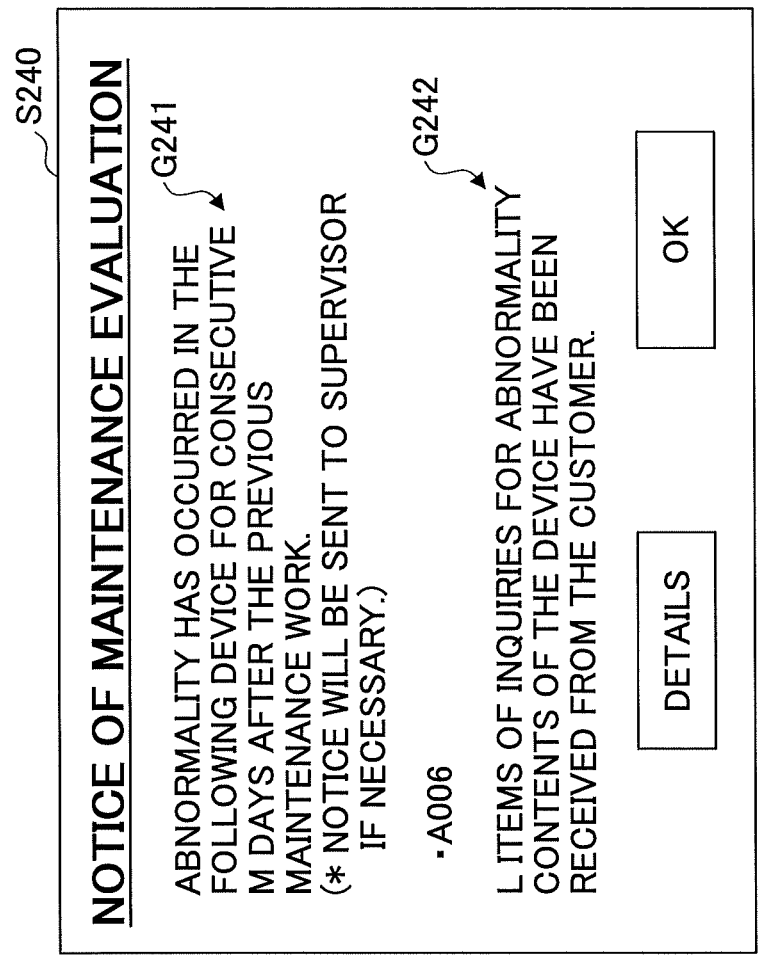

FIG.23

EVALUATION LIST

| STATE ICON | MAINTENANCE ID | WORKDAY | DEVICE ID | MODEL | ERROR CONTENT | WORK CONTENT | MAINTENANCE EVALUATION |
|---|---|---|---|---|---|---|---|
| ☺ | M001 | 2016/1/10 | A001 | X001 | EC001 (PAPER JAM OCCURRED) | PAPER JAM REMOVED PAPER FEEDING GUIDANCE | NO ABNORMALITY |
| ☺ | M003 | 2016/1/12 | A003 | X001 | EC001 (PAPER JAM OCCURRED) | PAPER JAM REMOVED PAPER FEEDING GUIDANCE | NO ABNORMALITY |
| ✖✖ | M003 | 2016/1/13 | A005 | X002 | EC002 (ABNORMAL SENSOR VALUE OF COMPONENT C) | COMPONENT C CLEANED | EC002 (ABNORMAL SENSOR VALUE OF COMPONENT C) |
| ⋮ | ⋮ | ⋮ | ⋮ | ⋮ | ⋮ | ⋮ | ⋮ |

OK

INFORMATION PROCESSING SYSTEM, INFORMATION PROCESSING APPARATUS, AND MEDIUM

BACKGROUND OF THE INVENTION

1. Field of the Invention

The present disclosure relates to an information processing system, an information processing apparatus, and a medium.

2. Description of the Related Art

For example, if a fault, an error, or the like occurs in a device such as an image forming device, the device sends a notice of the occurrence of the fault, the error, or the like to a management device or the like. In response to such a notice, a maintenance worker such as a customer engineer (CE) performs various maintenance work, such as repair and/or component replacement for the device in which the fault, the error, or the like has occurred.

Besides, a technology has been known that separates a component from a system if a fault occurs in the component after the component in the system has been repaired (see, for example, Patent document 1).

Here, if a fault, an error, or the like occurs again in the device after the maintenance work, the occurrence of the fault, the error, or the like is notified to the management device or the like. On the other hand, if a fault, an error, or the like does not occur in the device after the maintenance work, such a notice is not made.

Therefore, in order to confirm whether the device after the maintenance work operates normally (namely, whether the maintenance work was adequate), the maintenance worker needs to actually go to the setting place of the device, and to confirm the operational state of the device. However, if there are a considerable number of devices to which maintenance work was performed, it is difficult for the maintenance worker to confirm the operational states of the devices after the maintenance work one by one.

SUMMARY OF THE INVENTION

According to an embodiment in the present disclosure, an information processing apparatus includes a first storage device configured to store device data output regularly or non-regularly from a device connected to the information processing apparatus; a second storage device configured to store maintenance report data related to maintenance work performed on the device; and a processor. The processor is configured to evaluate whether the device on which the maintenance work was performed operates normally, based on the device data stored in the first storage device, and the maintenance report data stored in the second storage device, to generate an evaluation result; and send a notice of the evaluation result, to a terminal device connected to the information processing apparatus.

BRIEF DESCRIPTION OF DRAWINGS

FIG. 6 is a diagram illustrating an example of device data stored in a device DB;

FIG. 7 is a diagram illustrating an example of maintenance report data stored in a maintenance report DB;

FIG. 8 is a diagram illustrating an example of intermediate evaluation data stored in an intermediate evaluation DB;

FIG. 9 is a diagram illustrating an example of maintenance evaluation data stored in a maintenance evaluation DB;

FIG. 10 is a diagram illustrating an example of maintenance worker data stored in a maintenance worker DB;

FIG. 15A is a diagram illustrating an example of a case of determining whether an abnormality exists based on transition of a sensor value;

FIG. 15B is a diagram illustrating an example of a case of determining whether an abnormality exists based on transition of a sensor value;

FIG. 19B is a diagram illustrating another example of a notice screen of a maintenance evaluation;

FIG. 23 is a diagram illustrating an example of an evaluation list screen.

DETAILED DESCRIPTION OF THE EMBODIMENTS

In the following, embodiments in the present disclosure will be described with reference to the drawings. According to an embodiment in the present disclosure, it is possible to send a notice of the evaluation of maintenance work to the device.

[First Embodiment]

<System Configuration>

Figure 1:
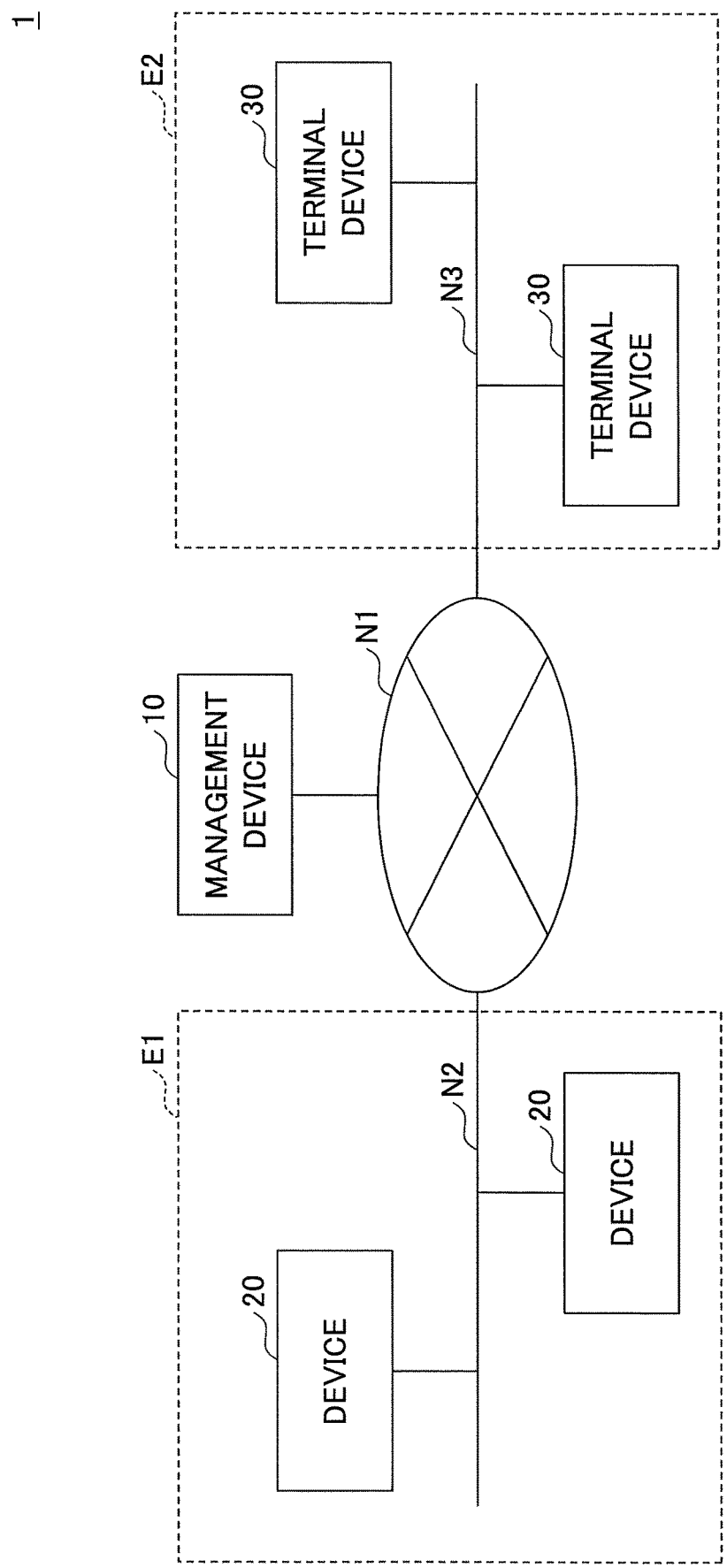
FIG. 1 is a diagram illustrating an example of a system configuration of a device management system according to a first embodiment.

First, a system configuration of a device management system 1 will be described according to an embodiment, with reference to FIG. 1. FIG. 1 is a diagram illustrating an example of a system configuration of the device management system 1 according to a first embodiment.

As illustrated in FIG. 1, the device management system 1 according to the embodiment includes a management device 10, one or more customer environments E1, and maintenance worker environments E2, which are connected, for example, via a wide area network N1 such as the Internet or a telephone line network, to be capable of communication.

The customer environment E1 is a system environment in a company, a government or municipal office, an apartment building, or the like, that uses a device 20, which will be described later. In the customer environment E1, one or more devices 20 are connected, for example via a network N2 such as a LAN (Local Area Network) or a wireless LAN, to be capable of communication.

The device 20 is an image forming device, for example, a printer, a scanner, or an MFP (Multifunction Peripheral). The device 20 transmits device data to the management device 10 regularly or non-regularly. The device data includes various information items related to states of the device 20. In other words, the device data includes, for example, information of the device 20, such as counter values of various functions (for example, a print function), usage counter values of consumables (for example, a toner), and sensor values of various sensors. The device data also includes, for example, information on the content of an error (for example, an error code) occurred in the device 20, the count of occurrences of the error.

Note that a case where an error occurs in the device 20 may correspond to a case where, for example, exception handling is executed on the device 20. Exception handling is executed on the device 20, for example, when a fault or a malfunction has occurred in a component, or when an unexpected wrong operation has been performed on the device 20.

The maintenance worker environment E2 is a system environment of a company or the like that carries out maintenance work on devices 20 included in the customer environment E1. One or more terminal devices 30 are connected to the maintenance worker environment E2, for example, via a network N3 of a wired LAN or a wireless LAN, to be capable of communication.

The terminal device 30 is a notebook PC (personal computer), a desktop type PC, a smart phone, a tablet terminal, or the like used by a maintenance worker such as a CE (customer engineer) who is in charge of the maintenance work of the device 20. Note that the maintenance worker is also called a service engineer, a serviceman, a maintenance work member, and the like.

The maintenance worker uses the terminal device 30 to create a maintenance report that represents the content of maintenance work that he/she performed (for example, workday, information of the device 20 to which the maintenance work has been applied, the content of an error occurred in the device 20, the content of work performed with respect to the error). Then, the terminal device 30 transmits maintenance report data representing the created maintenance report to the management device 10.

The management device 10 is a computer or a computer system that manages device data received from the device 20, and maintenance report data received from the terminal device 30.

Based on the device data received from the device 20, and the maintenance report data received from the terminal device 30, the management device 10 evaluates whether the device 20 to which the maintenance work has been applied operates normally. Then, the management device 10 sends a notice of the result of the evaluation (a maintenance evaluation) to the terminal device 30. Accordingly, the maintenance worker can recognize whether the maintenance work that he/she performed was adequate (in other words, whether the work content with respect to the error that had occurred in the device 20 was adequate).

Note that although a case will be described as an example in which the device 20 is an image forming device in the embodiment, the device 20 is not limited to be an image forming device. The device 20 may be, for example, a projector, a digital signage device, a terminal for videoconference, or a car navigation terminal. Alternatively, the device 20 may be an electric appliance such as an air-conditioner or a refrigerator, or may be a train, a vehicle, or the like. In other words, the device 20 simply needs to be an electronic device among various types of devices that regularly or non-regularly transmit device data including various information items related to states of the device.

Besides, although a case will be described as an example in which there is a single management device 10 in the embodiment, it is not limited as such. The device management system 1 according to the embodiment may include multiple management devices 10, for example, for multiple customer environments E1, respectively.

<Overview of Processes>

Figure 2:
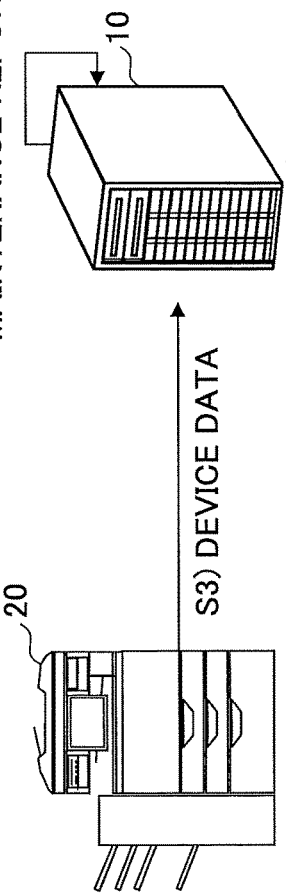
FIG. 2 is a diagram illustrating an overview of processes in a device management system.

Next, an overview of processes of the device management system 1 will be described according to the embodiment, with reference to FIG. 2. FIG. 2 is a diagram illustrating an overview of processes in the device management system 1. In the following, suppose that, for example, maintenance work of the device 20 in which an error has occurred is performed by a maintenance worker.

S1) The maintenance worker creates a maintenance report that represents the content of the maintenance work, by using the terminal device 30. Here, the maintenance worker can create the maintenance report on a creation screen G100 for the maintenance report, by inputting workday, worker, device ID (namely, an identification number that identifies the device 20), error content, and work content.

S2) The terminal device 30 transmits the maintenance report data that represents the maintenance report created by the maintenance worker to the management device 10. Accordingly, the management device 10 manages the maintenance report data received from the terminal device 30.

S3) Meanwhile, the device 20 transmits device data to the management device 10, for example, daily. Accordingly, the management device 10 manages the device data received from the device 20 after the maintenance.

S4) In response to receiving the device data from the device 20, the management device 10 evaluates the maintenance work, based on the device data and the maintenance report data that represents the content of the maintenance work performed on the device 20. When evaluating the maintenance work, the management device 10 evaluates whether the device 20 operates normally for a predetermined number of days (N days) after the maintenance work was performed.

S5) Having evaluated the maintenance work, the management device 10 transmits the maintenance evaluation data that represents the result of the evaluation, to the terminal device 30 of the maintenance worker who performed the maintenance work.

S6) In response to receiving the maintenance evaluation data, the terminal device 30 displays a notice screen G210 of the maintenance evaluation. The notice screen G210 of the maintenance evaluation displays, for example, a device ID of the device 20 that operates normally after the previous maintenance work was performed (namely, the device 20 in which an abnormality such as the error has not occurred for N days after the maintenance work). Accordingly, the maintenance worker can recognize that the device 20 after the maintenance work has been operating normally.

As described above, the device management system 1 according to the embodiment evaluates whether the device 20 after the maintenance operates normally for a predetermined number of days, based on the maintenance report data and the device data. Then, the device management system 1 according to the embodiment sends a notice of the maintenance evaluation that represents the result of the evaluation to the terminal device 30 of the maintenance worker who performed the maintenance work on the device 20. Accordingly, the maintenance worker can recognize whether the maintenance work that he/she performed on the device 20 was adequate.

<Hardware Configuration>

Figure 3:
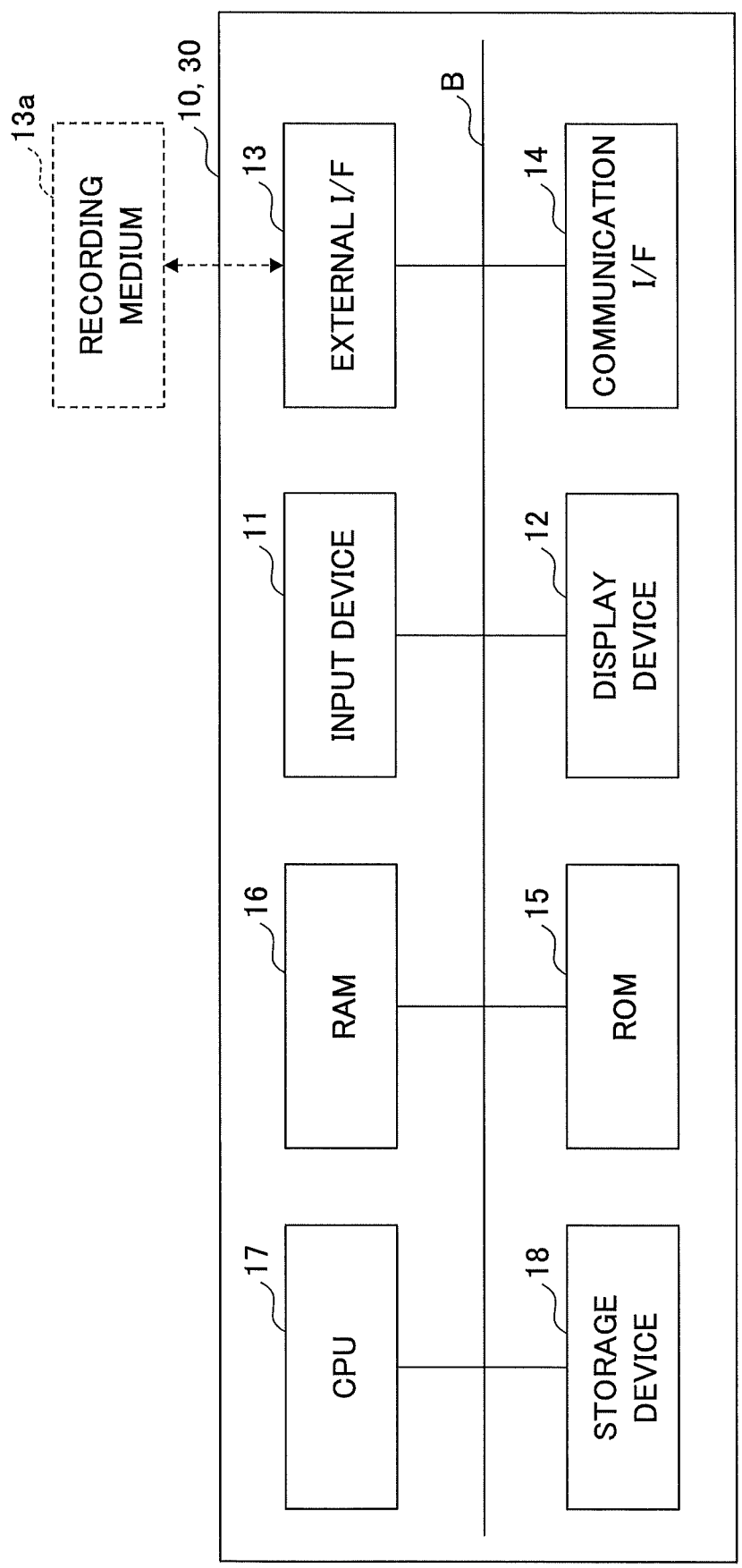
FIG. 3 is a diagram illustrating an example of a hardware configuration of a management device and a terminal device according to the first embodiment.

Next, a hardware configuration of the management device 10 and the terminal device 30 will be described according to the embodiment, with reference to FIG. 3. FIG. 3 is a diagram illustrating an example of a hardware configuration of the management device 10 and the terminal device 30 according to the first embodiment. In the following, the hardware configuration of the management device 10 will be mainly described because the management device 10 and the terminal device 30 have virtually the same hardware configuration.

As illustrated in FIG. 3, the management device 10 according to the embodiment includes an input device 11, a display device 12, an external I/F 13, and a communication I/F 14. The management device 10 according to the embodiment also includes a ROM (Read-Only Memory) 15, a RAM (Random Access Memory) 16, a CPU (Central Processing Unit) 17, and a storage device 18. These hardware components are connected to each other by a bus B.

The input device 11 includes a keyboard, a mouse, and a touch panel used by the user for inputting various operation signals. The display device 12 includes a display or the like to display a process result executed by the management device 10. Note that the management device 10 may have a form in which at least one of the input device 11 and the display device 12 is connected to the bus B when necessary.

The external I/F 13 is an interface to an external device. The external device may be a recording medium 13*a* or the like. The management device 10 can execute reading and writing on the recording medium 13*a* via the external I/F 13. The recording medium 13*a* may be, for example, a flexible disk, a CD, a DVD, an SD memory card, a USB memory, or the like. The communication I/F 14 is an interface for connecting the management device 10 to the network N1. The management device 10 can execute data communication with other devices (for example, the device 20 and the terminal device 30) via the communication I/F 14.

The ROM 15 is a non-volatile semiconductor memory that can hold a program and data even when the power is turned off. The ROM 15 stores programs and data such as BIOS (Basic Input/Output System), OS (Operating System) settings, network settings, and the like that are executed when starting up the management device 10. The RAM 16 is a volatile semiconductor memory that temporarily holds programs and data.

The CPU 17 is a processor that implements control and functions of the information processing apparatus 10 as a whole, by loading a program and data on the RAM 16 from the ROM 15 and the storage device 18, and executing a process.

The storage device 18 is, for example, an HDD (Hard Disk Drive) or an SSD (Solid State Drive), which is a non-volatile memory to store programs and data. Programs and data stored in the storage device 18 include an OS (Operating System), which is basic software to control the management device 10 as a whole, and application software running on the OS to provide various functions. Note that the storage device 18 manages the stored programs and data by a predetermined file system, DBs (databases), and the like.

Having the hardware configuration illustrated in FIG. 3 enables the management device 10 and the terminal device 30 according to the embodiment to implement various processes, which will be described later.

Figure 4:
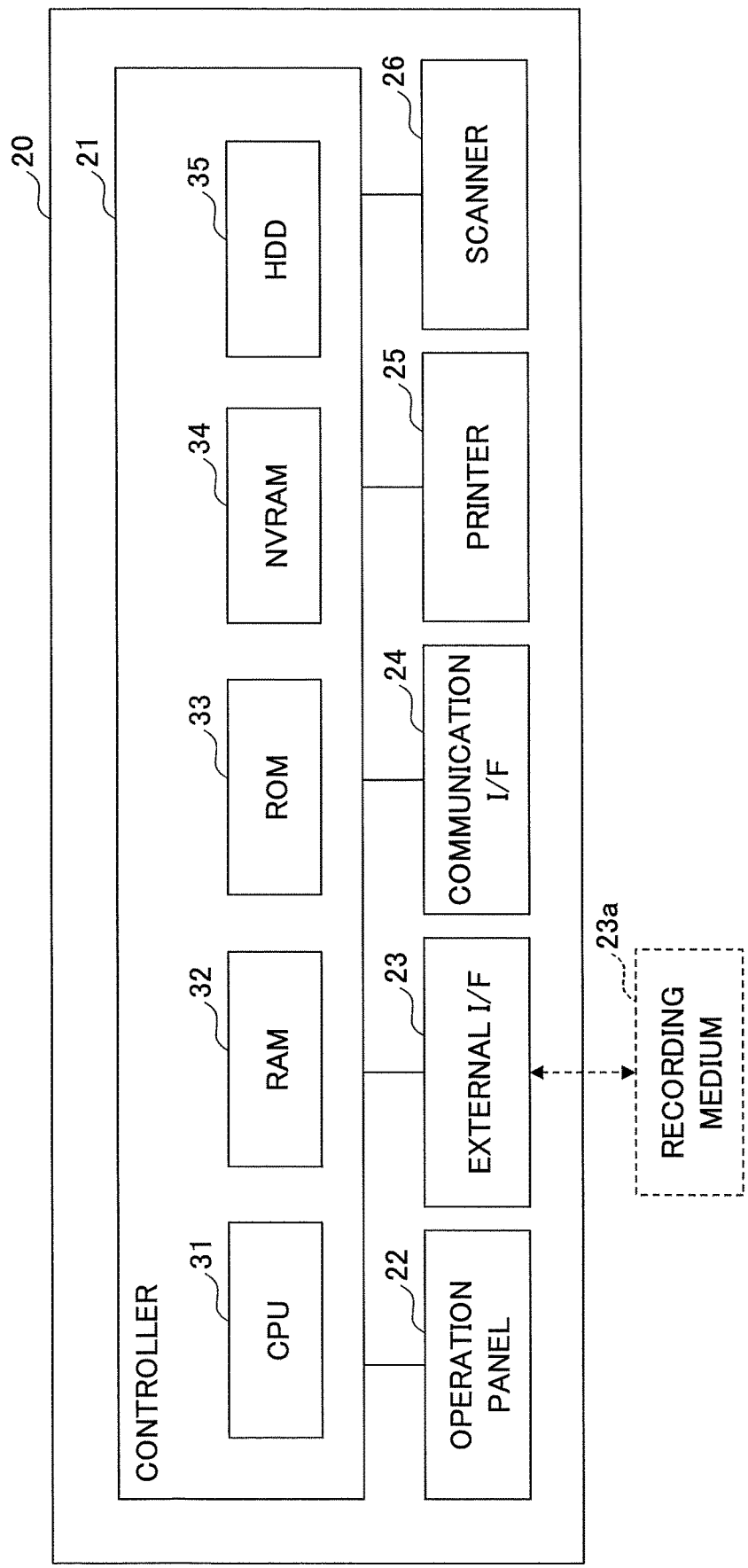
FIG. 4 is a diagram illustrating an example of a hardware configuration in the case where a device according to the first embodiment is an image forming device.

Next, a hardware configuration will be described in the case where the device 20 according to the embodiment is an image forming device, with reference to FIG. 4. FIG. 4 is a diagram illustrating an example of a hardware configuration in the case where the device 20 according to the first embodiment is an image forming device.

As illustrated in FIG. 4, the device 20 according to the embodiment includes a controller 21, an operation panel 22, an external I/F 23, a communication I/F 24, a printer 25, and a scanner 26. Also, the controller 21 includes a CPU 31, a RAM 32, a ROM 33, an NVRAM 34, and an HDD 35.

The ROM 33 is a non-volatile semiconductor memory that can hold programs and data even when the power is turned off, to store various programs and data. The RAM 32 is a volatile semiconductor memory that temporarily holds programs and data. The NVRAM 34 is a semiconductor memory that stores., for example, setting information. Also, the HDD 35 is a non-volatile storage that holds various programs and data.

The CPU 31 is a processor that implements control and functions of the device 20 as a whole, by loading a program and data on the RAM 32 from the ROM 33, the NVRAM 34, and the HDD 35, and executing a process.

The operation panel 22 is provided with an input part that receives input from the user, and a display part for displaying. The external I/F 23 is an interface to an external device. The external device may be a recording medium 23*a* or the like. The device 20 can execute reading and writing on the recording medium 23*a* via the external I/F 23. The recording medium 23*a* may be, for example, an IC card, a flexible disk, a CD, a DVD, an SD memory card, a USB memory, or the like.

The communication I/F 24 is an interface for connecting the device 20 to the network N2. The device 20 can execute data communication with another device (for example, the management device 10) via the communication I/F 24.

The printer 25 is a printing device for printing print data on an object to be conveyed. Note that the object to be conveyed may not be limited to paper, and may also be, for example, an OHP sheet, a plastic film, a copper foil, or the like. The scanner 26 is a reading device that scans a document to generate image data.

In the case where the device 20 according to the embodiment is an image forming device, having the hardware configuration illustrated in FIG. 4 enables the device 20 to implement various processes, which will be described later.

<Functional Configuration>

Figure 5:
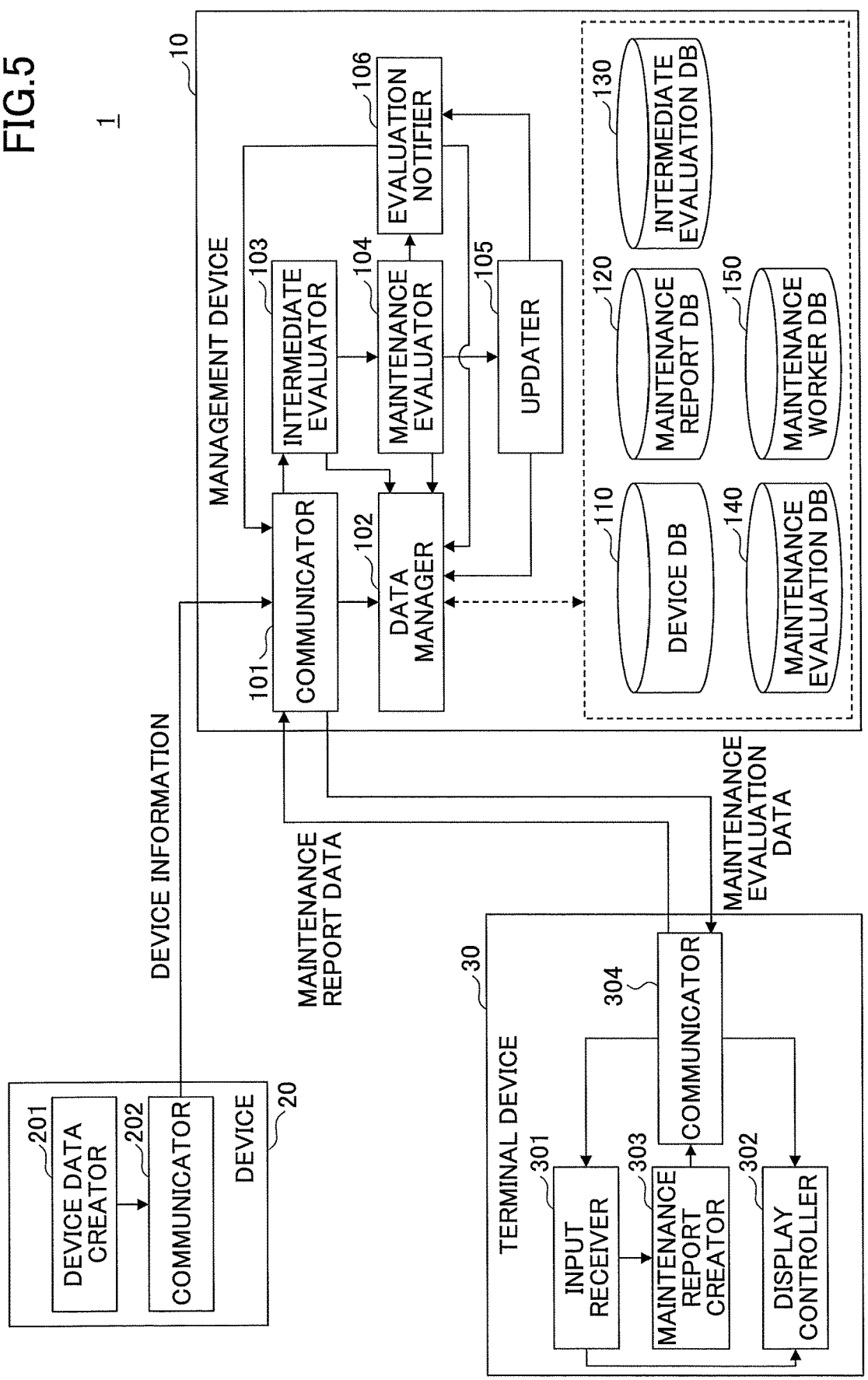
FIG. 5 is a diagram illustrating an example of a device configuration of a device management system according to the first embodiment.

Next, a functional configuration of the device management system 1 according to the embodiment will be described with reference to FIG. 5. FIG. 5 is a diagram illustrating an example of a device configuration of the device management system 1 according to the first embodiment.

As illustrated in FIG. 5, the terminal device 30 according to the embodiment includes an input receiver 301, a display controller 302, a maintenance report creator 303, and a communicator 304. These functional parts are implemented by processes that one or more programs installed in the terminal device 30 cause the CPU 17 to execute.

The input receiver 301 receives input of various operations. In other words, the input receiver 301 receives input of, for example, a display operation for a creation screen for a maintenance report.

The display controller 302 displays various screens on the display device 12. In other words, the display controller 302 displays, for example, a creation screen G100 for a maintenance report, and a notice screen G210 for a maintenance evaluation.

The maintenance report creator 303 creates maintenance report data. In other words, for example, if the input receiver 301 has received input of a creation operation of a maintenance report, the maintenance report creator 303 creates maintenance report data that includes various information items (workday, worker, device ID, error content, work content, and the like). Note that these various information items are input by a maintenance worker, for example, on the creation screen G100 for a maintenance report.

The communicator 304 transmits and receives various data items (for example, maintenance report data and maintenance evaluation data) to and from the management devices 10.

As illustrated in FIG. 5, the device 20 according to the embodiment includes a device data creator 201 and a communicator 202. These functional parts are implemented by processes that one or more programs installed in the device 20 cause the CPU 31 to execute.

The device data creator 201 creates device data, for example, at predetermined date and time. In the following, suppose that the device data creator 201 creates device data at a predetermined time every day (namely, creates device data daily). However, the creation time is not limited as such, and the device data creator 201 may also create device data, for example, weekly or monthly, or may create device data following a schedule set by the manufacturer of the device 20 or the user of the device 20.

The communicator 202 transmits and receives various data items (for example, device data created by the device data creator 201) to and from the management devices 10.

As illustrated in FIG. 5, the management device 10 according to the embodiment includes a communicator 101, a data manager 102, an intermediate evaluator 103, a maintenance evaluator 104, an updater 105, and an evaluation notifier 106. These functional parts are implemented by processes that one or more programs installed in the management device 10 cause the CPU 17 to execute.

The management device 10 according to the embodiment also includes a device DB 110, a maintenance report DB 120, an intermediate evaluation DB 130, a maintenance evaluation DB 140, and a maintenance worker DB 150.

These DBs can be implemented, for example, by using the storage device 18 or the like. Note that at least one of these DBs may be implemented, for example, by using a storage device or the like that is connected to the management device 10 via the network N1.

The communicator 101 transmits and receives various data items (for example, maintenance report data, maintenance evaluation data, and device data) to and from the device 20 and the terminal device 30.

The data manager 102 obtains data stored in various DBs, and stores various data items in the DBs. In other words, the data manager 102 stores, for example, device data received by the communicator 101 in the device DB 110. Also, the data manager 102 stores, for example, maintenance report data received by the communicator 101 in the maintenance report DB 120. Furthermore, the data manager 102 obtains, for example, maintenance evaluation data from the maintenance evaluation DB 140.

Note that the intermediate evaluator 103, the maintenance evaluator 104, and the updater 105 obtain data stored in the various DBs via the data manager 102, and store various data items in the DBs. In the following, when describing that the intermediate evaluator 103, the maintenance evaluator 104, and the updater 105 obtain data stored in the various DBs; store various data items in the DBs; or refer to data stored in the various DBs, the wording "via the data manager 102" may be omitted.

The intermediate evaluator 103 determines whether to create intermediate evaluation data that represents an intermediate evaluation of maintenance work performed on the device 20, based on device data received by the communicator 101, and maintenance report data stored in the maintenance report DB 120. Then, if having determined to create the intermediate evaluation data, the intermediate evaluator 103 creates the intermediate evaluation data based on the device data and the maintenance report data.

Here, an intermediate evaluation is a daily evaluation of the maintenance work performed on the device 20 (for example, whether an abnormality corresponding to the error that caused the maintenance work occurs in the device 20 on the day). The intermediate evaluation data created by the intermediate evaluator 103 is stored in the intermediate evaluation DB 130 via the data manager 102.

The maintenance evaluator 104 evaluates the maintenance work performed on the device 20, based on the intermediate evaluation data stored in the intermediate evaluation DB 130. In other words, for example, the maintenance evaluator 104 determines whether consecutive N items (where N is a predetermined number) of intermediate evaluation data representing that an abnormality corresponding to the error that caused the maintenance work has not occurred in the device 20, are stored in the intermediate evaluation DB 130.

Then, if consecutive N items of intermediate evaluation data representing that the abnormality has not occurred in the device 20, are stored in the intermediate evaluation DB 130, the maintenance evaluator 104 creates maintenance evaluation data representing that the device 20 has been operating normally for N days.

On the other hand, for example, if the latest item of intermediate evaluation data stored in the intermediate evaluation DB 130 is intermediate evaluation data representing that the abnormally has occurred in the device 20, the maintenance evaluator 104 creates maintenance evaluation data representing that the abnormality has occurred.

The updater 105 updates maintenance worker data stored in the maintenance worker DB 150, based on the maintenance evaluation data created by the maintenance evaluator 104. Here, the maintenance worker data includes counts of maintenance evaluations for each maintenance worker (namely, the count of "no abnormality" for N days, and the count of "abnormality found" within N days). Therefore, the updater 105 updates the count of maintenance evaluations of "no abnormality" or the count of maintenance evaluations of "abnormality found" in the maintenance worker data, depending on the maintenance evaluation ("no abnormality" or "abnormality found") represented in the maintenance evaluation data created by the maintenance evaluator 104.

The evaluation notifier 106 transmits the maintenance evaluation data created by the maintenance evaluator 104 to the terminal device 30 of the maintenance worker who performed the evaluated maintenance work.

The device DB 110 stores device data 110D. Here, the device data stored in the device DB 110 will be described with reference to FIG. 6. FIG. 6 is a diagram illustrating an example of device data 110D stored in the device DB 110.

As illustrated in FIG. 6, the device data 110D stored in the device DB 110 includes data items of "device ID", "date and time", "model", "item 1 (sensor value)", "item 2 (error content)", and "item (counter value)".

A device ID (for example, a manufacturing-specific number or a serial number), which is identification information to identify the device 20, is set to "device ID". Information representing the date and time when the device data 110D was created is set to "date and time". Model information representing the model number or the like of the device 20 is set to "model".

A sensor value of a predetermined sensor (for example, a temperature sensor) installed in the device 20 is set to "item 1 (sensor value)" is set. An error content (for example, an error code) of error occurred in the device 20 is set to "item 2 (error content)". A counter value of a predetermined function (for example, print function) of the device 20 is set to "item 3 (counter value)". Note that other than these items, the device data 110D may include various data items, for example, the number of occurrences of the error, usage counter values of consumables (for example, a toner).

The maintenance report DB 120 stores maintenance report data 120D. Here, the maintenance report data 120D stored in the maintenance report DB 120 will be described with reference to FIG. 7. FIG. 7 is a diagram illustrating an example of the maintenance report data 120D stored in the maintenance report DB 120.

As illustrated in FIG. 7, the maintenance report data 120D stored in the maintenance report DB 120 includes data items of "maintenance ID", "workday", "maintenance worker ID", "device ID", "model", "error content", "work content", and "intermediate evaluation flag".

A maintenance ID, which is identification information to identify the maintenance work is set to "maintenance ID". A workday, which is the date when the maintenance work was performed, is set to "workday". A maintenance worker ID (for example, an employee number), which is identification information to identify the maintenance worker who performed the maintenance work is set to "maintenance worker ID". A device ID (for example, a manufacturing-specific number or a serial number), which is identification information to identify the device 20 to which the maintenance work has been applied, is set to "device ID". Model information representing the model number or the like of the device 20 is set to "model", as described above.

An error content (for example, an error code) of the error that caused the maintenance work is set to "error content". A work content (for example, paper jam removal, paper feeding guidance, or component replacement) of the maintenance work performed by the maintenance worker with respect to the error content is set to "work content". A value of a flag for determining whether to create intermediate evaluation data is set to "intermediate evaluation flag".

The intermediate evaluation DB 130 stores intermediate evaluation data 130D. Here, the intermediate evaluation data 130D stored in the intermediate evaluation DB 130 will be described with reference to FIG. 8. FIG. 8 is a diagram illustrating an example of the intermediate evaluation data 130D stored in the intermediate evaluation DB 130.

As illustrated in FIG. 8, the intermediate evaluation DB 130 stores the intermediate evaluation data 130D for each maintenance ID. Also, the intermediate evaluation data 130D includes data items of "intermediate evaluation date", "error content", "work content", and "intermediate evaluation".

An intermediate evaluation date representing the date when the intermediate evaluation data 130D was created is set to "intermediate evaluation date". An intermediate evaluation representing a daily evaluation of the maintenance work performed on the device 20 (for example, whether an abnormality corresponding to the error that caused the maintenance work occurs in the device 20 on the day) is set to "intermediate evaluation". Note that "error content" and "work content" are set as described above.

The maintenance evaluation DB 140 stores maintenance evaluation data 140D. Here, the maintenance evaluation data 140D stored in the maintenance evaluation DB 140 will be described with reference to FIG. 9. FIG. 9 is a diagram illustrating an example of the maintenance evaluation data 140D stored in the maintenance evaluation DB 140.

As illustrated in FIG. 9, the maintenance evaluation data 140D stored in the maintenance evaluation DB 140 includes data items of "maintenance ID", "workday", "maintenance valuation date", "maintenance worker ID", "device ID", "model", "error content", "work content", and "maintenance evaluation".

Information representing the date on which the maintenance evaluation data 140D was created is set to "maintenance valuation date". A maintenance evaluation representing an evaluation (for example, whether an abnormality corresponding to the error that caused the maintenance work has not occurred in the device 20 for N days) of the maintenance work performed on the device 20 is set to "maintenance evaluation". Note that "maintenance ID", "workday", "maintenance worker ID", "device ID", "model", "error content", and "work content" are set as described above.

The maintenance worker DB 150 stores maintenance worker data 150D. Here, the maintenance worker data 150D stored in the maintenance worker DB 150 will be described with reference to FIG. 10. FIG. 10 is a diagram illustrating an example of the maintenance worker data 150D stored in the maintenance worker DB 150.

As illustrated in FIG. 10, the maintenance worker data 150D stored in the maintenance worker DB 150 includes data items of "maintenance worker ID", "count of "no abnormality" maintenance evaluations", "count of "abnormality found" maintenance evaluations", and "destination of notice of maintenance evaluation".

The count of items of maintenance evaluation data 140D whose maintenance evaluation is "no abnormality" among items of maintenance evaluation data 140D of a maintenance worker ID set to "maintenance worker ID" is set to "count of "no abnormality" maintenance evaluations". In other words, for example, if the maintenance worker ID is "CE001", the count of items of maintenance evaluation data 140D in which the maintenance worker ID is "CE001", and the maintenance evaluation is "no abnormality" is set to "count of "no abnormality" maintenance evaluations".

The count of items of maintenance evaluation data 140D whose maintenance evaluation is "abnormality found " among items of maintenance evaluation data 140D of a maintenance worker ID set to "maintenance worker ID" is set to "count of "abnormality found" maintenance evaluations". In other words, for example, if the maintenance worker ID is "CE001", the count of items of maintenance evaluation data 140D in which the maintenance worker ID is "CE001", and the maintenance evaluation is "abnormality found" is set to "count of "abnormality found" maintenance evaluations".

A destination address (namely, a destination of a notice of maintenance evaluation) to which the maintenance evaluation data 140D is to be transmitted is set to "destination of notice of maintenance evaluation". Note that "maintenance worker ID" is set as described above.

<Details of Processes>

Next, processes of the device management system 1 will be described in detail according to the embodiment.

Figure 11:
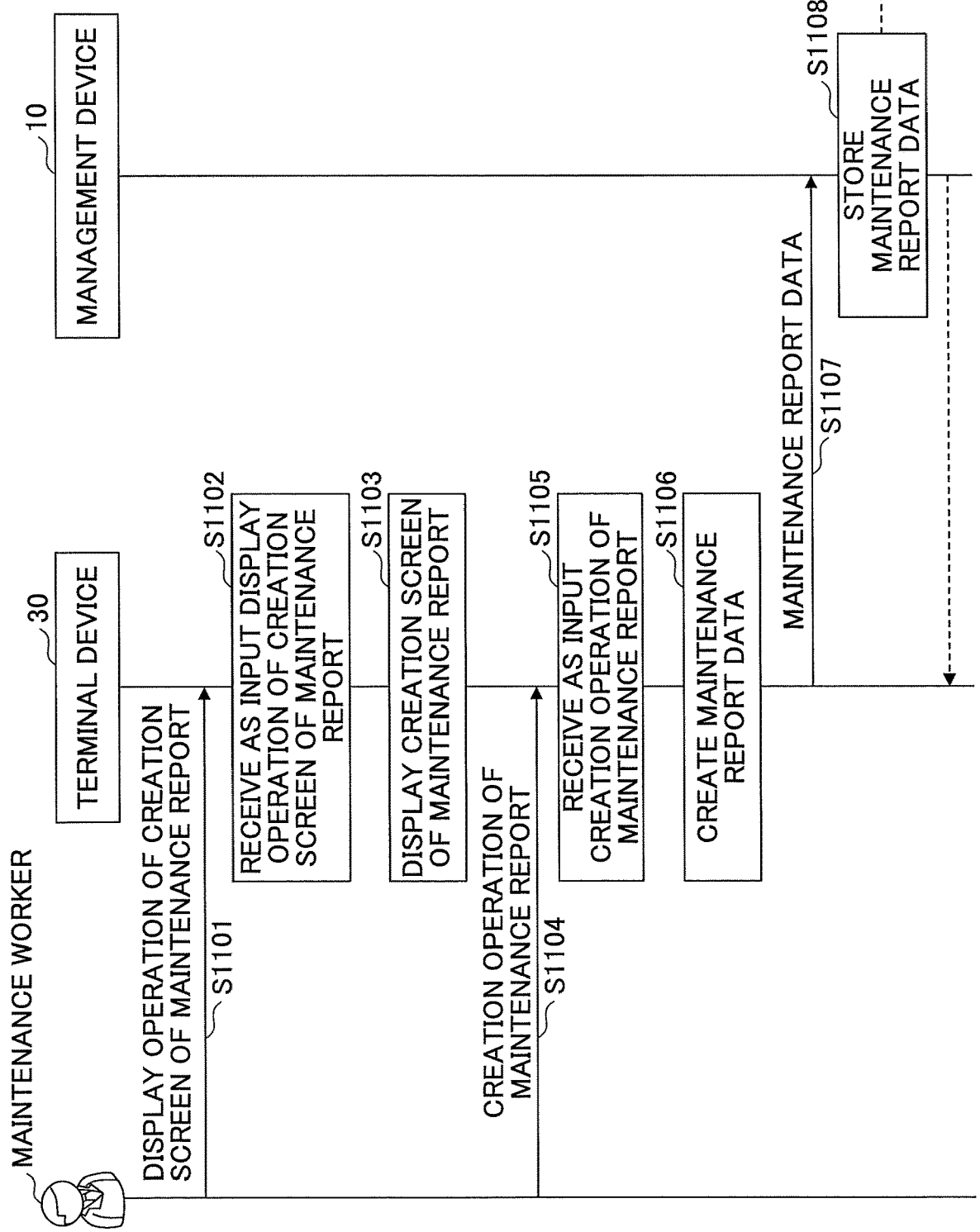
FIG. 11 is a sequence chart illustrating an example of a process that starts with creating a maintenance report, and concludes with storing the report according to the first embodiment.

First, a process will be described with reference to FIG. 11 in which a maintenance worker who performed maintenance work on the device 20 creates a maintenance report, and the maintenance report data 120D representing the created maintenance report is eventually stored in the maintenance report DB 120 of the management device 10. FIG. 11 is a sequence chart illustrating an example of the process that starts with creating a maintenance report, and concludes with storing the report according to the first embodiment.

The maintenance worker who performed the maintenance work on the device 20 performs a display operation of a creation screen of a maintenance report for creating the maintenance report of the maintenance work by using the terminal device 30 (Step S1101). Note that the maintenance worker can perform the display operation of the creation screen of the maintenance report, for example, by selecting a predetermined icon or the like on a predetermined screen displayed on the display device 12 of the terminal device 30.

If the display operation of the creation screen of the maintenance report has been performed, the input receiver 301 of the terminal device 30 receives input of the display operation (Step S1102).

Figure 12:
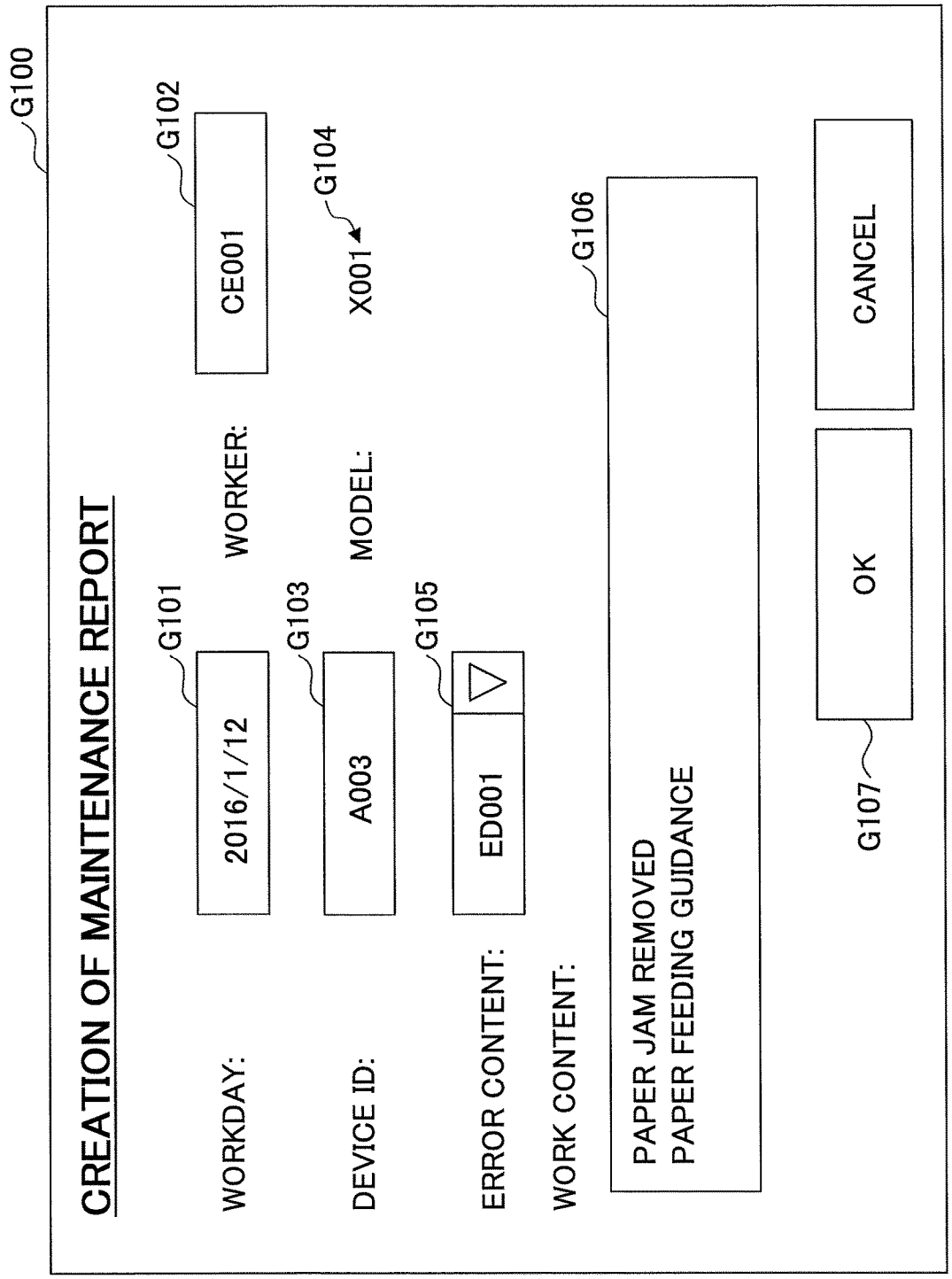
FIG. 12 is a diagram illustrating an example of a creation screen of a maintenance report.

Next, once the input of the creation screen of the maintenance report of display operation has been received by the input receiver 301, the display controller 302 of the terminal device 30 displays a creation screen G100 for the maintenance report, for example, illustrated in FIG. 12 (Step S1103).

Here, the creation screen G100 for the maintenance report illustrated in FIG. 12 includes a workday input field G101, a worker input field G102, a device ID input field G103, a model display field G104, an error content selection field G105, a work content input field G106, and an OK button G107.

On the creation screen G100 for the maintenance report illustrated in FIG. 12, the maintenance worker inputs the workday, the maintenance worker ID, the device ID, and the work content into the workday input field G101, the worker input field G102, the device ID input field G103, and the work content input field G106, respectively. Also, the maintenance worker selects an error content (for example, an error code) corresponding to the error that caused the maintenance work, in the error content selection field G105. Note that the model display field G104 displays, for example, the model information of the device 20 represented by the device ID input into the device ID input field G103.

Then, the maintenance worker pushes the OK button G107, to perform a creation operation of the maintenance report (Step S1104). Accordingly, the maintenance worker can create the maintenance report that represents the content of the maintenance work performed on the device 20.

In response to the performed creation operation of the maintenance report, the input receiver 301 of the terminal device 30 receives input of the creation operation (Step S1105).

Next, once the input of the creation operation of the maintenance report has been received by the input receiver 301, the maintenance report creator 303 of the terminal device 30 creates maintenance report data 120D that represents the maintenance report (Step S1106). In other words, the maintenance report creator 303 creates the maintenance report data 120D including various information items (workday, maintenance worker ID, device ID, model information, work content, error content, and the like) input on the creation screen G100 for the maintenance report illustrated in FIG. 12, the maintenance ID, and the intermediate evaluation flag "1".

Next, once the maintenance report data has been created by the maintenance report creator 303, the communicator 304 of the terminal device 30 transmits the maintenance report data to the management device 10 (Step S1107).

Once the communicator 101 has received the maintenance report data 120D, the data manager 102 of the management device 10 stores the maintenance report data 120D in the maintenance report DB 120 (Step S1108).

As described above, in the device management system 1 according to the embodiment, the maintenance report data 120D representing the maintenance report created by the maintenance worker is stored in the maintenance report DB 120 of the management device 10.

Figure 13:
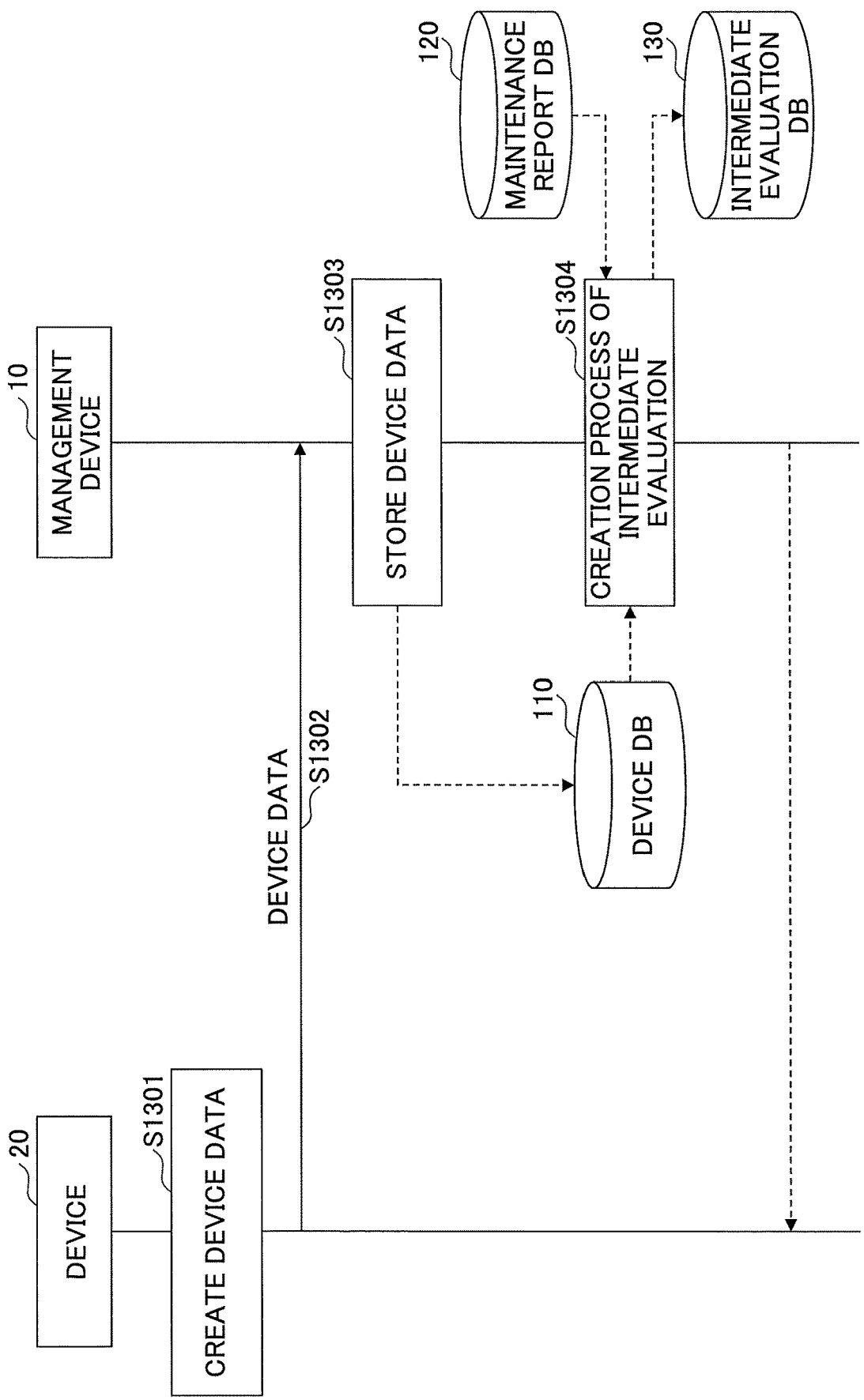
FIG. 13 is a sequence chart illustrating an example of a process that starts with creating device data, and concludes with creating intermediate evaluation data.

Next, a process will be described that starts with creating device data 110D on the device 20 after the maintenance work was performed, and concludes with creating intermediate evaluation data 130D on the management device 10, with reference to FIG. 13. FIG. 13 is a sequence chart illustrating an example of the process that starts with creating device data 110D, and concludes with creating intermediate evaluation data 130D.

The device data creator 201 of the device 20 creates device data 110D at a predetermined time every day (Step S1301).

Once the device data 110D has been created by the device data creator 201, the communicator 202 of the device 20 transmits the device data 110D to the management device 10 (Step S1302).

In response to receiving the device data 110D by the communicator 101, the data manager 102 of the management device 10 stores the device data 110D in the device DB 110 (Step S1303).

The intermediate evaluator 103 of the management device 10 executes a creation process of an intermediate evaluation based on the device data 110D received by the communicator 101, and the maintenance report data 120D stored in the maintenance report DB 120 (Step S1304).

Figure 14:
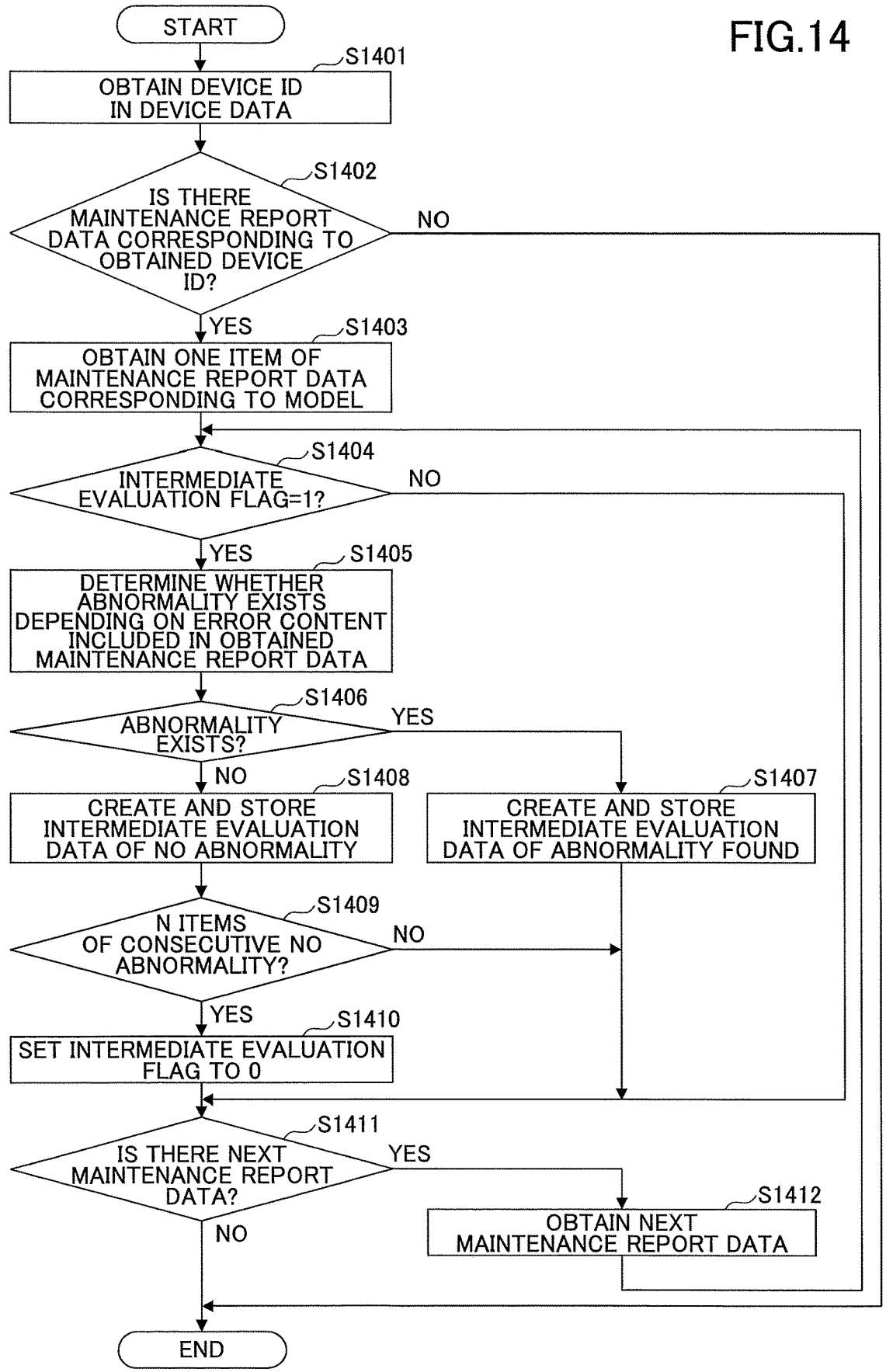
FIG. 14 is a flowchart illustrating an example of a creation process of an intermediate evaluation according to the first embodiment.

Here, the creation process of an intermediate evaluation will be described with reference to FIG. 14. FIG. 14 is a flowchart illustrating an example of the creation process of an intermediate evaluation according to the first embodiment.

First, the intermediate evaluator 103 obtains a device ID included in the device data 110D received by the communicator 101 (Step S1401).

Next, the intermediate evaluator 103 determines whether maintenance report data 120D corresponding to the device ID obtained at Step S1401 above is stored in the maintenance report DB 120 (Step S1402). In other words, if the device ID obtained at Step S1401 above is "A001", the intermediate evaluator 103 determines whether maintenance report data 120D in which "A001" is set to the data item "device ID", is stored in the maintenance report DB 120.

If having determined at Step S1402 that maintenance report data 120D corresponding to the device ID is not stored, the intermediate evaluator 103 ends the process.

On the other hand, if having determined at Step S1402 that maintenance report data 120D corresponding to the device ID is stored, the intermediate evaluator 103 obtains one item of the maintenance report data 120D corresponding to the device ID (Step S1403). In other words, in the case where the device ID obtained at Step S1401 above is "A001", the intermediate evaluator 103 obtains one item of the maintenance report data 120D among items of the maintenance report data 120D in which "A001" is set to the data item "device ID", from the maintenance report DB 120.

Next, the intermediate evaluator 103 determines whether "1" (meaning an intermediate evaluation required) is set to the data item "intermediate evaluation flag" in the obtained maintenance report data 120D (Step S1404).

If having determined at Step S1404 that "1" is not set to the data item "intermediate evaluation flag" (namely, if having determined that "0" (meaning an intermediate evaluation not required)" is set), the intermediate evaluator 103 proceeds to execute Step S1411, which will be described later.

On the other hand, if having determined at Step S1404 that "1" is set to the data item "intermediate evaluation flag", the intermediate evaluator 103 determines whether an abnormality exists depending on the data item "error content" (Step S1405).

In other words, for example, the intermediate evaluator 103 compares the data item "error content" in the obtained maintenance report data 120D, with the data item "item 2 (error content)" in the device data 110D stored in the device DB 110 by the data manager 102. Then, for example, if the same error code is set in the data item "error content" in the maintenance report data 120D, and in the data item "item 2 (error content)" in the device data 110D, the intermediate evaluator 103 determines the comparison result as "abnormality found". On the other hand, the intermediate evaluator 103 determines the comparison result as "no abnormality", if the error code is not set in the data item "item 2 (error content)" in the device data 110D.

In this way, the intermediate evaluator 103 determines it as "abnormality found" if the same error code is set in the data item "error content" in the maintenance report data 120D, and in the data item "item 2 (error content)" in the device data 110D. In other words, the intermediate evaluator 103 determines it as "abnormality found", for example, if the error (for example, occurrence of paper jam) that caused the maintenance work of the device 20 occurs in the device 20 after the maintenance work.

Here, the intermediate evaluator 103 may determine whether an abnormality exists, for example, from transition of a sensor value of the device 20 after the maintenance work, based on the obtained maintenance report data 120D and the device data 110D stored in the device DB 110.

For example, as illustrated in FIGS. 15A-15B, suppose that a permissible range (a normal range) of the sensor value of a certain sensor is $S_1$ to $S_2$. Also, suppose that the sensor value exceeded the upper limit $S_2$ of the permissible range at time $t_1$, and consequently, maintenance work (e.g., component replacement) has been performed at time $t_2$.

In this case, if the sensor value at time $t_3$ converges, for example, on the mean value $(S_2-S_1)/2$ of $S_2$ and $S_1$ as illustrated in FIG. 15A, the intermediate evaluator 103 determines it as "no abnormality". On the other hand, if the sensor value at time $t_3$ does not converge on, for example, the mean value $(S_2-S_1)/2$ of $S_2$ and $S_1$ as illustrated in FIG. 15B (in other words, if the sensor value changes unstably although the value is within the normal range), it determines it as "abnormality found".

In this way, the intermediate evaluator 103 may determine whether an abnormality exists from transition of the value of a predetermined data item in the device data 110D stored in the device DB 110 (for example, a sensor value of a component related to the error that caused the maintenance work).

If having determined it as "abnormality found" at Step S1405 (YES at Step S1406), the intermediate evaluator 103 creates intermediate evaluation data 130D having "abnormality found" set to the data item "the intermediate evaluation". Then, the intermediate evaluator 103 associates the intermediate evaluation data 130D with the maintenance ID of the maintenance report data 120D, and stores the associated data in the intermediate evaluation DB 130 (Step S1407). Accordingly, the intermediate evaluation data 130D corresponding to the maintenance report data 120D is stored in the intermediate evaluation DB 130.

Note that at Step S1407 above, the intermediate evaluator 103 sets the present date to the data item "intermediate evaluation date". Also, the intermediate evaluator 103 sets the same information as in the obtained maintenance report data 120D to the data items "error content" and "work content".

On the other hand, if having determined it as "no abnormality" at Step S1405 (NO at Step S1406), the intermediate evaluator 103 creates intermediate evaluation data 130D having "no abnormality" set to the data item "the intermediate evaluation". Then, the intermediate evaluator 103 associates the intermediate evaluation data 130D with the maintenance ID of the maintenance report data 120D, and stores the associated data in the intermediate evaluation DB 130 (Step S1408). Accordingly, the intermediate evaluation data 130D corresponding to the maintenance report data 120D is stored in the intermediate evaluation DB 130.

Note that at Step S1408 above, the intermediate evaluator 103 sets the present date to the data item "intermediate evaluation date". Also, the intermediate evaluator 103 sets the same information as in the obtained maintenance report data 120D to the data items "error content" and "work content".

Next, the intermediate evaluator 103 determines whether consecutive N items of intermediate evaluation data 130D in which the data item "intermediate evaluation" is "no abnormality", are stored in the intermediate evaluation DB 130 (Step S1409). In other words, the intermediate evaluator 103 determines whether the intermediate evaluation "no abnormality" has continued for N days. Here, N is an integer greater than or equal to 1 that has been set in advance, for example, by the administrator or the maintenance worker of the management device 10.

If having determined at Step S1409 that consecutive N items of intermediate evaluation data 130D having the intermediate evaluation of "no abnormality" are stored, the intermediate evaluator 103 sets "0" to the data item "intermediate evaluation flag" in the maintenance report data 120D (Step S1410). Accordingly, intermediate evaluation data 130D corresponding to the maintenance report data 120D will not be created thereafter.

Following Step S1407 or S1410, or if having determined at Step S1409 that consecutive N items of intermediate evaluation data 130D having the intermediate evaluation of "no abnormality" are not stored, the intermediate evaluator 103 determines whether there is a next item of maintenance report data 120D (Step S1411). In other words, the intermediate evaluator 103 determines whether there is an item of maintenance report data 120D among items of the maintenance report data 120D in which the device ID obtained at Step S1401 above is set to the data item "device ID".

If having determined at Step S1410 that there is a next item of maintenance report data 120D, the intermediate evaluator 103 obtains the next item of maintenance report data 120D from the maintenance report DB 120 (Step S1412). In other words, the intermediate evaluator 103 obtains an item of maintenance report data 120D yet to be obtained among items of the maintenance report data 120D in which the device ID obtained at Step S1401 above is set to the data item "device ID".

Then, the intermediate evaluator 103 executes Step S1404 to Step S1411 for the obtained item of the maintenance report data 120D. In other words, the intermediate evaluator 103 executes Step S1404 to Step S1411 for each item of maintenance report data 120D among items of the maintenance report data 120D stored in the maintenance report DB 120 in which the device ID obtained at Step S1401 above is set to the data item "device ID".

On the other hand, if having determined at Step S1410 that there is no next item of maintenance report data 120D, the intermediate evaluator 103 ends the process.

As described above, in the device management system 1 according to the embodiment, once the device 20 has created and transmitted device data 110D, intermediate evaluation data 130D that represents an intermediate evaluation of the maintenance work is created from maintenance report data 120D that represents the content of the maintenance work performed on the device 20. This enables the device management system 1 according to the embodiment to daily create intermediate evaluation data 130D with respect to the maintenance work performed on the device 20, if the device 20 creates and transmits the device data 110D daily.

Figure 16:
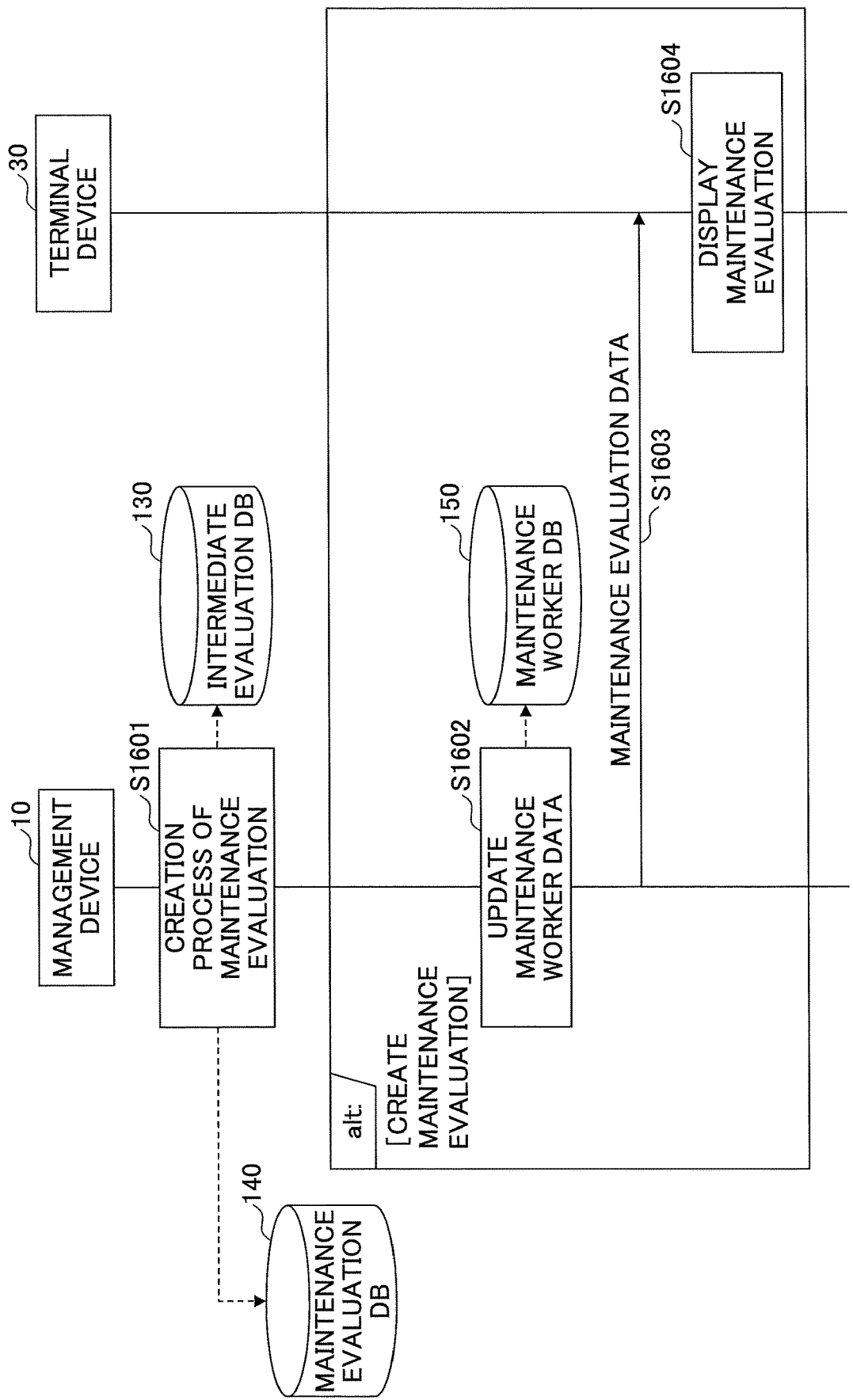
FIG. 16 is a sequence chart illustrating an example of a process that starts with creating a maintenance evaluation, and concludes with displaying the evaluation according to the first embodiment.

Next, a process will be described that starts with creating a maintenance evaluation, which is an evaluation result of the maintenance work performed on the device 20, and concludes with displaying the maintenance evaluation on the terminal device 30 of the maintenance worker who performed the maintenance work, with reference to FIG. 16. FIG. 16 is a sequence chart illustrating an example of the process that starts with creating a maintenance evaluation, and concludes with displaying the evaluation according to the first embodiment. Note that the process of creating the maintenance evaluation to the displaying illustrated in FIG. 16 is executed, for example, after the process of creating device data 110D illustrated in FIG. 13 to creating intermediate evaluation data 130D has been completed.

The maintenance evaluator 104 of the management device 10 executes a creation process of a maintenance evaluation based on intermediate evaluation data 130D stored in the intermediate evaluation DB 130 (Step S1601).

Figure 17:
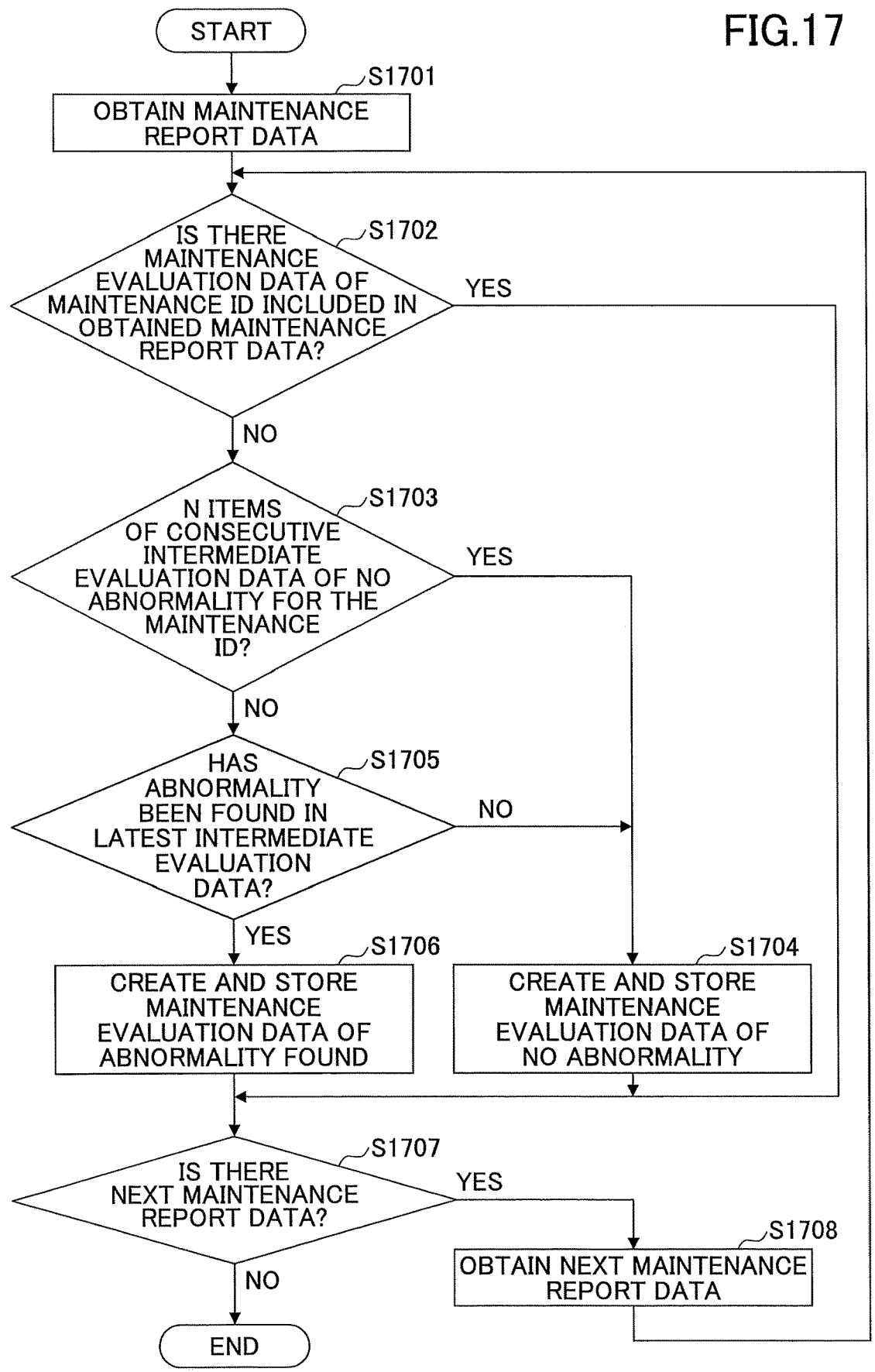
FIG. 17 is a flowchart illustrating an example of a creation process of a maintenance evaluation according to the first embodiment.

Here, the creation process of a maintenance evaluation will be described with reference to FIG. 17. FIG. 17 is a flowchart illustrating an example of the creation process of a maintenance evaluation according to the first embodiment.

First, the maintenance evaluator 104 obtains one item of maintenance report data 120D from the maintenance report DB 120 (Step S1701).

Next, the maintenance evaluator 104 determines whether maintenance evaluation data 140D having the maintenance ID included in the obtained maintenance report data 120D is stored in the maintenance evaluation DB 140 (Step S1702). In other words, the maintenance evaluator 104 determines whether the maintenance evaluation data 140D corresponding to the obtained maintenance report data 120D has already been created.

If having determined at Step S1702 that the maintenance evaluation data 140D is not stored, the maintenance evaluator 104 determines whether consecutive N items of intermediate evaluation data 130D having the intermediate evaluation of "no abnormality" exist (Step S1703). In other words, the maintenance evaluator 104 determines whether consecutive N items of intermediate evaluation data 130D associated with the maintenance ID, and having the intermediate evaluation of "no abnormality" are stored in the intermediate evaluation DB 130.

On the other hand, if having determined at Step S1702 that the maintenance evaluation data 140D is stored, the maintenance evaluator 104 proceeds to execute Step S1707. In this case, the maintenance evaluation data 140D is not created.

If having determined at Step S1703 that consecutive N items of the intermediate evaluation data 130D exist, the maintenance evaluator 104 creates maintenance evaluation data 140D in which "no abnormality" is set to the data item "maintenance evaluation". Then, the maintenance evaluator 104 stores the maintenance evaluation data 140D in the maintenance evaluation DB 140 (Step S1704). Accordingly, the maintenance evaluation data 140D corresponding to the maintenance report data 120D is stored in the maintenance evaluation DB 140.

Note that at Step S1704 above, the maintenance evaluator 104 sets the present date to the data item "maintenance evaluation date". Also, the maintenance evaluator 104 sets the same information as in the obtained maintenance report data 120D to the data items "maintenance ID", "workday", "maintenance worker ID", "device ID", "model", "error content", and "work content".

On the other hand, if having determined at Step S1703 that consecutive N items of the intermediate evaluation data 130D do not exist, the maintenance evaluator 104 determines whether "abnormality found" is set to the data item "intermediate evaluation" in the latest item of intermediate evaluation data 130D (Step S1705). In other words, the maintenance evaluator 104 determines whether an item of intermediate evaluation data 130D having the latest date in the data item "intermediate evaluation date" among items of the intermediate evaluation data 130D associated with the maintenance ID, has "abnormality found" in the data item "intermediate evaluation".

If having determined at Step S1705 that the data item "intermediate evaluation" of the latest intermediate evaluation data 130D is "abnormality found", the maintenance evaluator 104 creates maintenance evaluation data 140D having "abnormality found" set to the data item "maintenance evaluation". Then, the maintenance evaluator 104 stores the maintenance evaluation data 140D in the maintenance evaluation DB 140 (Step S1706). Accordingly, the maintenance evaluation data 140D corresponding to the maintenance report data 120D is stored in the maintenance evaluation DB 140.

Note that at Step S1706 above, the maintenance evaluator 104 sets the present date to the data item "maintenance evaluation date". Also, the maintenance evaluator 104 sets the same information as in the obtained maintenance report data 120D to the data items "maintenance ID", "workday", "maintenance worker ID", "device ID", "model", "error content", and "work content".

On the other hand, if having determined at Step S1705 that the data item "intermediate evaluation" of the latest item of intermediate evaluation data 130D is not "abnormality found", the maintenance evaluator 104 proceeds to execute Step S1707 (namely, if having determined it as "no abnormality"). In this case, the maintenance evaluation data 140D is not created.

Next, the maintenance evaluator 104 determines whether there is a next item of maintenance report data 120D from the maintenance report DB 120 (Step S1706). In other words, the maintenance evaluator 104 determines whether there is an item of maintenance report data 120D yet to be obtained among items of maintenance report data 120D stored in the maintenance report DB 120.

If having determined at Step S1707 that there is a next item of maintenance report data 120D, the maintenance evaluator 104 obtains the next item of maintenance report data 120D from the maintenance report DB 120 (Step S1708).

Then, the maintenance evaluator 104 executes Step S1702 to Step S1707 for the obtained item of maintenance report data 120D. In other words, the maintenance evaluator 104 executes Step S1702 to Step S1707 for each item of maintenance report data 120D stored in the maintenance report DB 120.

On the other hand, if having determined at Step S1707 that there is no next item of maintenance report data 120D, the maintenance evaluator 104 ends the process.

As described above, the management device 10 according to the embodiment creates maintenance evaluation data 140D for each item of maintenance report data 120D. At this time, the management device 10 according to embodiment creates maintenance evaluation data 140D corresponding to the maintenance report data 120D, and having the maintenance evaluation of "no abnormality", if consecutive N items of the intermediate evaluation data 130D having the intermediate evaluation of "no abnormality" exist. On the other hand, the management device 10 according to the embodiment creates maintenance evaluation data 140D having the maintenance evaluation of "abnormality found", if the intermediate evaluation of the latest item of intermediate evaluation data 130D corresponding to the maintenance report data 120D is "abnormality found".

Referring back to FIG. 16, if the maintenance evaluation data 140D has been created by the maintenance evaluator 104, the updater 105 of the management device 10 updates the maintenance worker data 150D based on the maintenance evaluation data 140D (Step S1602).

In other words, for example, suppose that the maintenance evaluation in the maintenance evaluation data 140D is "no abnormality" and the maintenance worker ID is "CE001". In this case, the updater 105 causes the data manager 102 to add "1" to "count of "no abnormality" maintenance evaluations" in the maintenance worker data 150D having the maintenance worker ID of "CE001", among the maintenance worker data 150D stored in the maintenance worker DB 150.

On the other hand, suppose that the maintenance evaluation in the maintenance evaluation data 140D is "abnormality found" and the maintenance worker ID is "CE001". In this case, the updater 105 causes the data manager 102 to add "1" to "count of "abnormality found" maintenance evaluations" in the maintenance worker data 150D having the maintenance worker ID of "CE001", among the maintenance worker data 150D stored in the maintenance worker DB 150.

Note that in this case, for example, if "count of "abnormality found" maintenance evaluations" in the maintenance worker data 150D exceeds a predetermined value, the updater 105 may execute an update to cause the data manager 102 to add "supervisor" to "destination of notice of maintenance evaluation" in the maintenance worker data 150D. Alternatively, for example, if the ratio of "count of "abnormality found" maintenance evaluations" to "count of "no abnormality" maintenance evaluations" in the maintenance worker data 150D exceeds a predetermined value, the updater 105 may execute an update to cause the data manager 102 to add "supervisor" to "destination of notice of maintenance evaluation" in the maintenance worker data 150D.

Accordingly, for example, if there are a considerable number of maintenance evaluations of "abnormality found", or if the proportion of the maintenance evaluations of "abnormality found" is high, it is possible to add the supervisor of the maintenance worker to "destination of notice of maintenance evaluation". Note that a person to be added to "destination of notice of maintenance evaluation" is not limited to the supervisor, and may also be, for example, a team leader, or another maintenance worker who is in charge of maintaining the same device 20 as the maintenance worker.

Next, the evaluation notifier 106 of the management device 10 causes the communicator 101 to transmit the maintenance evaluation data 140D created at Step S1601 above, to the terminal device 30 (Step S1603). At this time, the evaluation notifier 106 obtains the destination of notice set to "destination of notice of maintenance evaluation" in the maintenance worker data 150D corresponding to the maintenance worker ID included in the maintenance evaluation data 140D. Then, the evaluation notifier 106 transmits the maintenance evaluation data 140D to the terminal device 30 of the obtained destination of notice.

Note that if multiple items of maintenance evaluation data 140D have been created at Step S1601 above, the evaluation notifier 106 transmits these items of maintenance evaluation data 140D.

If the communicator 304 has received the maintenance evaluation data 140D, the display controller 302 of the terminal device 30 displays a notice screen of the maintenance evaluation represented by the maintenance evaluation data 140D (Step S1604).

Figure 18A:
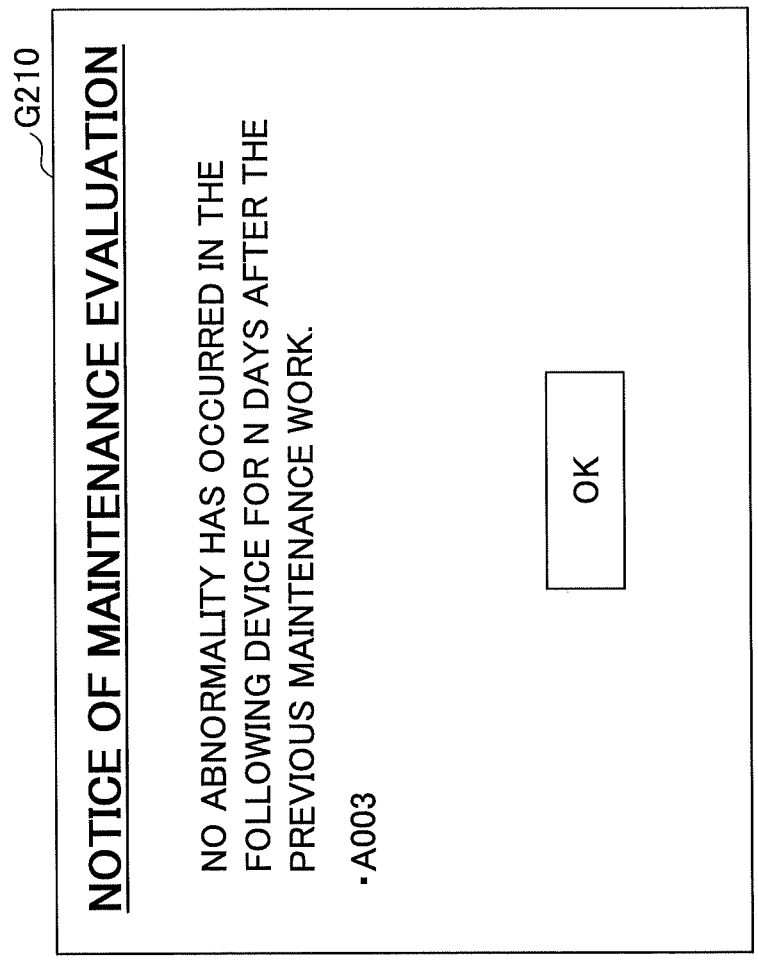
FIG. 18A is a diagram illustrating an example of a notice screen of a maintenance evaluation.

In other words, for example, if the maintenance evaluation of the maintenance evaluation data 140D received by the communicator 304 is "no abnormality", the display controller 302 displays, for example, a notice screen G210 of the maintenance evaluation illustrated in FIG. 18A. Accordingly, the maintenance worker can confirm the device 20 in which the abnormality has not occurred for N days after the maintenance work was performed.

Figure 18B:
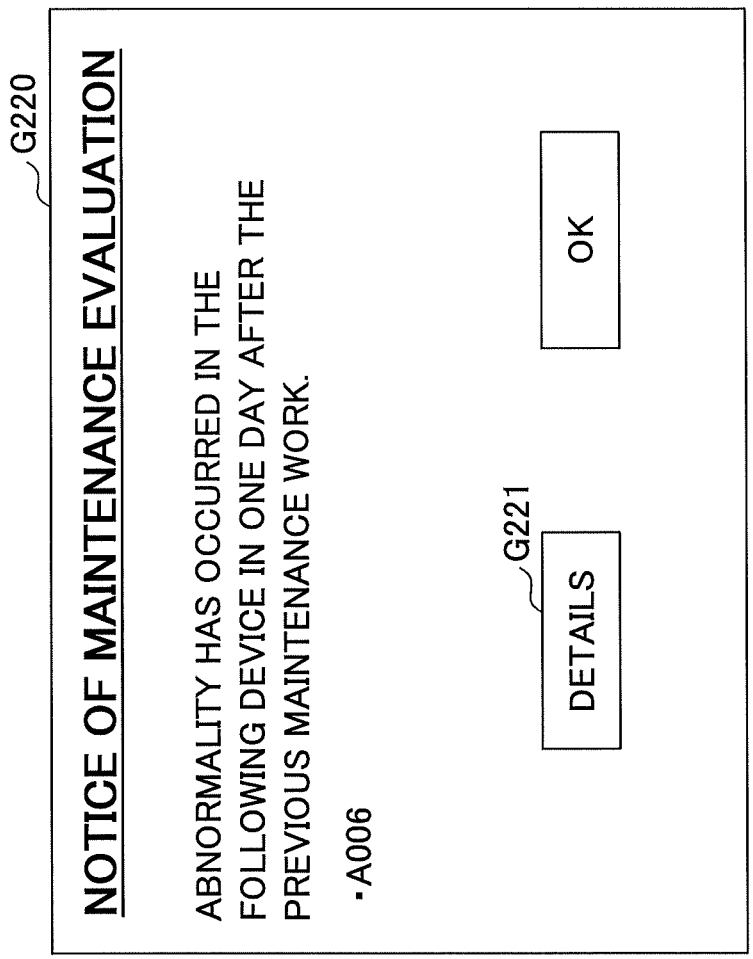
FIG. 18B is a diagram illustrating another example of a notice screen of a maintenance evaluation.

On the other hand, if the maintenance evaluation of the maintenance evaluation data 140D received by the communicator 304 is "abnormality found ", the display controller 302 displays, for example, a notice screen G220 of the maintenance evaluation illustrated in FIG. 18B. Accordingly, the maintenance worker can confirm that the abnormality has occurred in the device 20 on which the maintenance work was performed. Note that at this time, the maintenance worker can confirm that details of the abnormality that has occurred in the device 20, by pressing a "detail" button G221.

Figure 19A:
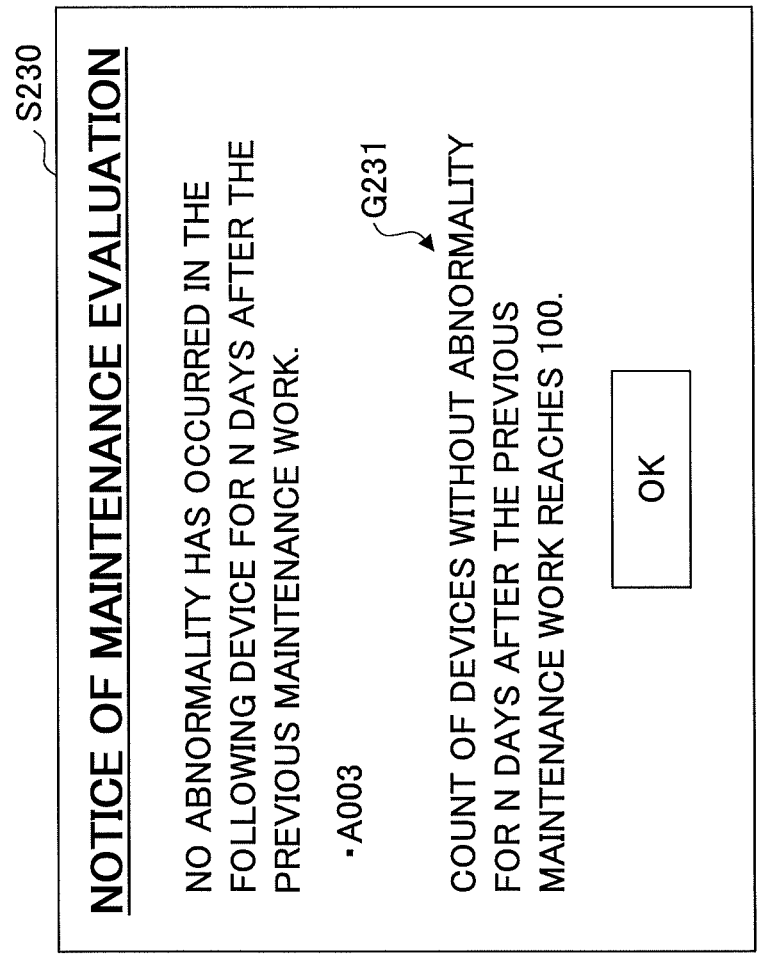
FIG. 19A is a diagram illustrating another example of a notice screen of a maintenance evaluation.

Also, for example, if the maintenance evaluation of the maintenance evaluation data 140D received by the communicator 304 is "no abnormality", the display controller 302 may display, for example, a notice screen G230 of the maintenance evaluation illustrated in FIG. 19A. On the notice screen G230 of the maintenance evaluation illustrated in FIG. 19A, a notice G231 is displayed indicating that the number of devices 20 on which the maintenance worker performed the maintenance work, and the abnormality has not occurred for N days, exceeds a predetermined number.

Note that although the notice G231 displayed on the notice screen G230 of the maintenance evaluation illustrated in FIG. 19A indicates that the number of devices 20 in which the abnormality has not occurred for N days, exceeds a predetermined number, it is not limited as such. The notice G231 may also be an indication that the proportion of devices 20 in which the abnormality has not occurred for N days, exceeds a predetermined proportion.

Furthermore, for example, if the maintenance evaluation of the maintenance evaluation data 140D received by the communicator 304 is "abnormality found", the display controller 302 may display, for example, a notice screen G240 of the maintenance evaluation illustrated in FIG. 19B. On the notice screen G240 of the maintenance evaluation illustrated in FIG. 19B, a notice G241 is displayed indicating that the abnormality has occurred for consecutive M days in the device 20 on which the maintenance worker performed the maintenance work. The notice G241 may be displayed, for example, when the maintenance evaluator 104 has created maintenance evaluation data 140D indicating that consecutive M items of intermediate evaluation data 130D having the intermediate evaluation of "abnormality found" are stored in the intermediate evaluation DB 130.

Also, a notice G242 indicating that L items of inquiries on the device 20 in terms of the content of the abnormality, have been received from the customer of the device 20 on which the maintenance worker performed the maintenance work is displayed on the notice screen G240 of the maintenance evaluation illustrated in FIG. 19B. The notice G242 may be displayed, for example, when the maintenance evaluator 104 has created maintenance evaluation data 140D indicating that L items of inquiries in terms of the content of the abnormality, have been received from the customer.

Note that the evaluation notifier 106 of the management device 10 may delete the maintenance evaluation data 140D transmitted to the terminal device 30 at Step S1603 above from the maintenance evaluation DB 140, or may not delete it to be maintained. By deleting the maintenance evaluation data 140D from the maintenance evaluation DB 140, the data capacity of the maintenance evaluation DB 140 can be reduced. On the other hand, by maintaining the maintenance evaluation data 140D in the maintenance evaluation DB 140, for example, it is possible to use the maintenance evaluation data 140D for other use such as analysis.

As described above, the device management system 1 according to the embodiment sends a notice to the maintenance worker that the abnormality has not occurred in the device 20 for a predetermined number of days after the maintenance work of the device 20 was performed (in other words, the device 20 has been operating normally for the predetermined number of days after the maintenance work was performed). In other words, the device management system 1 according to the embodiment sends a notice to the maintenance worker of an evaluation representing whether the maintenance work performed on the device 20 was adequate. Accordingly, for example, the maintenance worker can confirm whether cause analysis in the maintenance work, and measures taken with respect to the cause were appropriate.

[Second Embodiment]

In the following, a second embodiment will be described. The second embodiment relates to displaying a list of maintenance evaluations on the terminal device 30. Accordingly, the maintenance worker can confirm evaluations (maintenance evaluations) of maintenance work that he/she performed on the device 20 by a list.

Note that in the second embodiment, differences from the first embodiment will be mainly described, and for elements or steps having substantially the same functions or processed in substantially the same way as in the first embodiment, description will be omitted appropriately.

<Functional Configuration>

Figure 20:
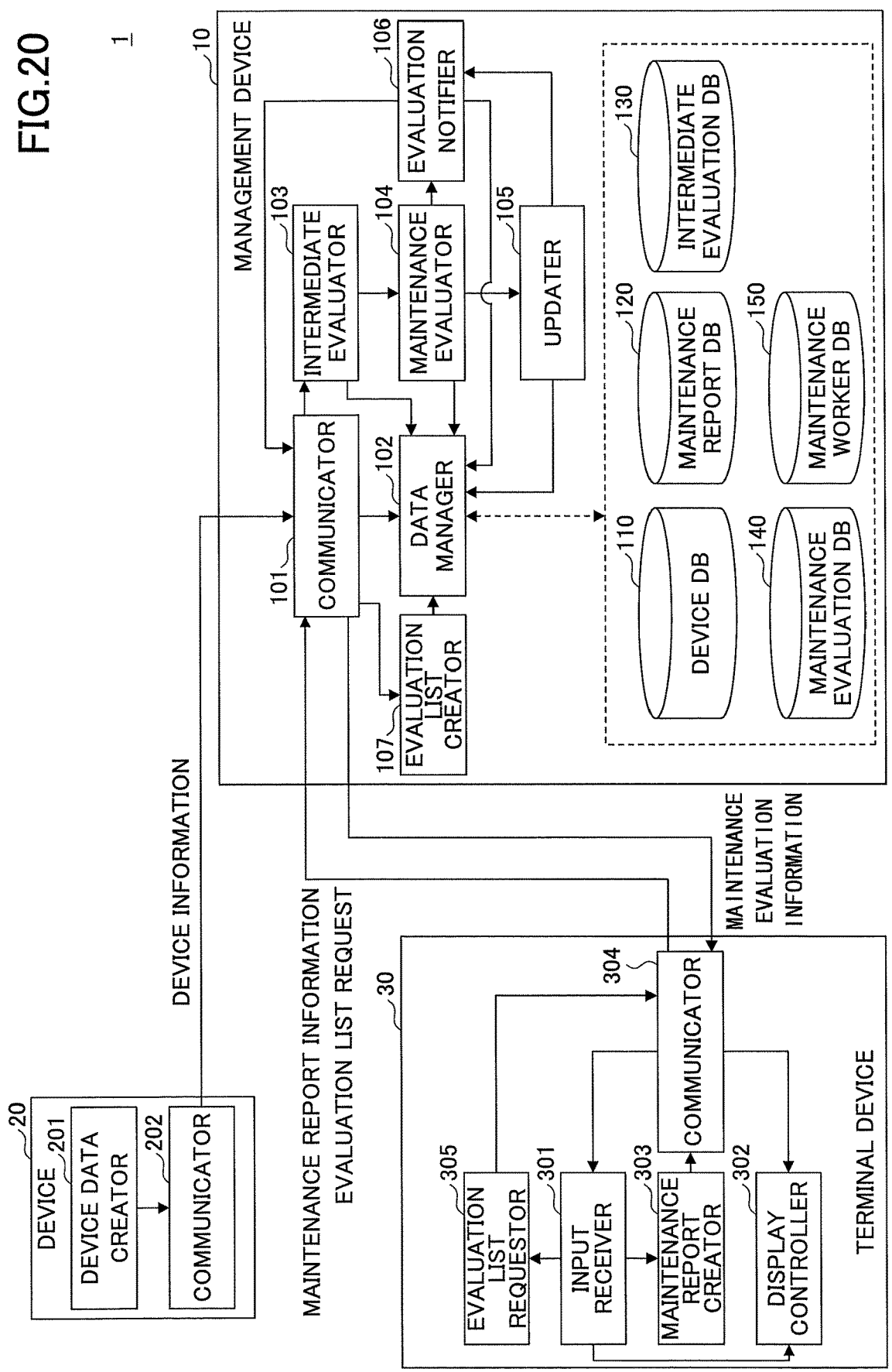
FIG. 20 is a diagram illustrating an example of a functional configuration of a device management system according to a second embodiment.

First, a functional configuration of a device management system 1 according to the embodiment will be described with reference to FIG. 20. FIG. 20 is a diagram illustrating an example of a functional configuration of a device management system 1 according to the second embodiment.

As illustrated in FIG. 20, the terminal device 30 according to the embodiment further includes an evaluation list requestor 305. The functional part is implemented by a process that one or more programs installed in the terminal device 30 cause the CPU 17 to execute.

The evaluation list requestor 305 transmits an obtainment request for an evaluation list to the management device 10. Here, an obtainment request for an evaluation list includes display condition information representing a condition (display condition) for a maintenance evaluation to be displayed in the list. The display condition is specified by the maintenance worker, for example, on a predetermined screen (a specification screen of a display condition, which will be described later) displayed by the display controller 302.

As illustrated in FIG. 20, the management device 10 according to the embodiment further includes an evaluation list creator 107. The functional part is implemented by a process that one or more programs installed in the terminal device 30 cause the CPU 17 to execute.

If an obtainment request for an evaluation list has been received by the communicator 101, the evaluation list creator 107 obtains maintenance evaluation data 140D from the maintenance evaluation DB 140 based on a display condition information included in the obtainment request. Then, the evaluation list creator 107 creates an evaluation list from the obtained maintenance evaluation data 140D.

<Details of Process>

Figure 21:
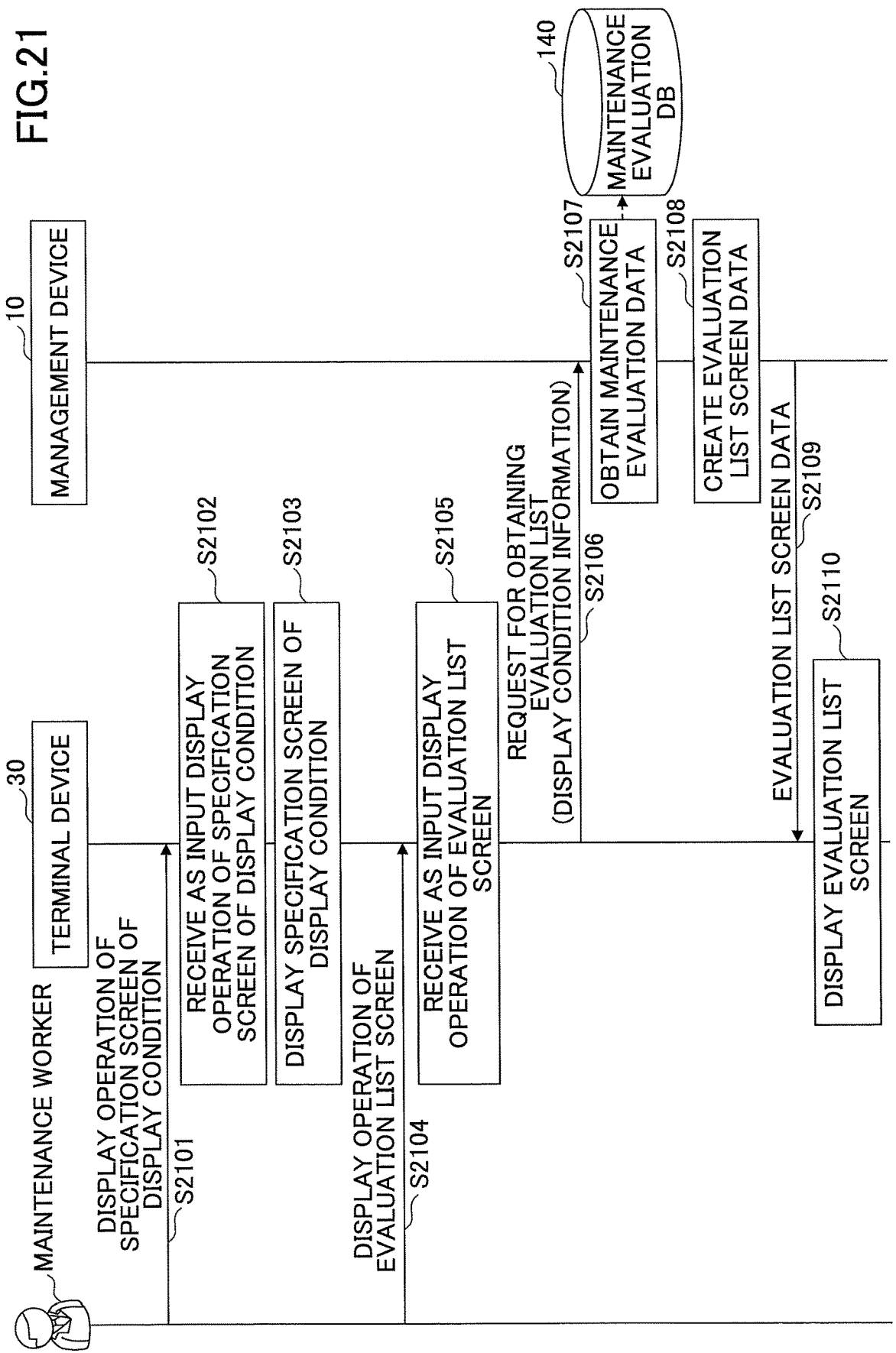
FIG. 21 is a sequence chart illustrating an example of a process for displaying an evaluation list according to the second embodiment.

Next, a process of the device management system 1 according to the embodiment will be described in detail. In the following, the process will be described that starts with specifying a display condition for displaying an evaluation list, and concludes with displaying the evaluation list, with reference to FIG. 21. FIG. 21 is a sequence chart illustrating an example of the process for displaying an evaluation list according to the second embodiment.

First, the maintenance worker performs a display operation of a specification screen of a display condition for specifying the display condition, by using the terminal device 30 (Step S2101). Note that the maintenance worker can perform the display operation of the specification screen of the display condition, for example, by selecting a predetermined icon or the like on a predetermined screen displayed on the display device 12 of the terminal device 30.

In response to receiving the performed display operation of the specification screen of the display condition, the input receiver 301 of the terminal device 30 receives input of the display operation (Step S2102).

Figure 22:
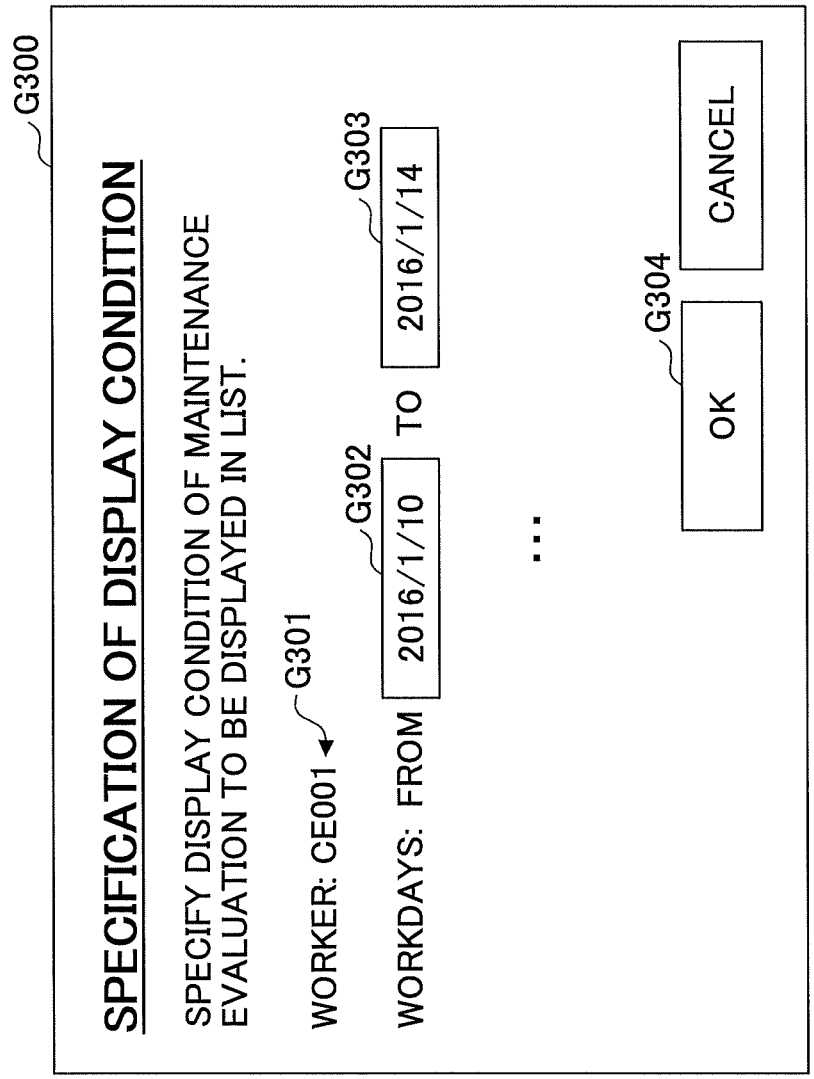
FIG. 22 is a diagram illustrating an example of a specification screen of a display condition.

Next, once the input of the specification screen of the display condition of the display operation has been received by the input receiver 301, the display controller 302 of the terminal device 30 displays, for example, a specification screen G300 of a display condition illustrated in FIG. 22 (Step S2103).

Here, the specification screen G300 of a display condition illustrated in FIG. 22 includes a worker display field G301, a first workday input field G302, a second workday input field G303, and an OK button G304.

On the specification screen G300 of the display condition illustrated in FIG. 22, the maintenance worker inputs a range of workdays of maintenance evaluations as a display condition in the first workday input field G302 and the second workday input field G303. For example, by inputting "2016/1/10" in the first workday input field G302 and "2016/1/14" in the second workday input field G303, it is possible to display a list of maintenance evaluations in which the workday is within a range after "2016/1/10" and before "2016/1/14". Also, on the worker display field G301, the maintenance worker ID of the maintenance worker who performed the display operation of the specification screen of the display condition is displayed.

Note that the maintenance worker may specify, for example, an error content, a maintenance evaluation, a device ID, and a model as display conditions on the specification screen G300 of the display condition illustrated in FIG. 22. Also, on the specification screen G300 of the display condition illustrated in FIG. 22, the maintenance worker may specify as a display condition, for example, the number of days n (N) during which the device 20 operates normally after the maintenance work.

Then, the maintenance worker pushes the OK button G304, and executes a display operation of the evaluation list screen (Step S2104). Accordingly, the maintenance worker can create a maintenance report that represents the content of the maintenance work performed on the device 20.

If the display operation of the evaluation list screen has been performed, the input receiver 301 of the terminal device 30 receives the input of the display operation (Step S2105).

Next, once the display operation of the evaluation list screen has been executed by the input receiver 301, the evaluation list requestor 305 of the terminal device causes the communicator 304 to transmit the obtainment request of the evaluation list to the management device 10 (Step S2106). Here, the obtainment request of the evaluation list includes the display condition information representing the display condition specified by the maintenance worker on the specification screen G300 of the display condition illustrated in FIG. 22.

Having received the obtainment request of the evaluation list by the communicator 101, the evaluation list creator 107 of the management device 10 obtains maintenance evaluation data 140D that satisfies the display condition information included in the obtainment request from the maintenance evaluation DB 140 (Step S2107).

In other words, for example, suppose that display condition information includes a range specification of the workday "2016/1/10 to 2016/1/14". In this case, the evaluation list creator 107 obtains items of maintenance evaluation data 140D having the data item "workday" after "2016/1/10" and before 2016/1/14" from the maintenance evaluation DB 140.

Also, for example, suppose that the display condition information includes a specification of the maintenance evaluation being "abnormality found". In this case, the evaluation list creator 107 obtains maintenance evaluation data 140D having the data item "maintenance evaluation" of "abnormality found" from the maintenance evaluation DB 140.

Note that if the display condition information includes, for example, the number of days n ($\leq$N) during which the device 20 operates normally after the maintenance work, the evaluation list creator 107 may cause the maintenance evaluator 104 to recreate maintenance evaluation data 140D from the intermediate evaluation data 130D stored in the intermediate evaluation DB 130.

Next, the evaluation list creator 107 of the management device 10 creates evaluation list screen data for displaying an evaluation list screen, based on the obtained maintenance evaluation data 140D (Step S2108). Note that the evaluation list creator 107 may create the evaluation list screen data in a data format of, for example, HTML (HyperText Markup Language).

Next, the communicator 101 of the management device 10 transmits the evaluation list screen data created by the evaluation list creator 107 to the terminal device 30 (Step S2108).

In response to receiving the evaluation list screen data by the communicator 304, the display controller 302 of the terminal device 30 displays, for example, an evaluation list screen G400 illustrated in FIG. 23 based on the evaluation list screen data (Step S2109).

Here, a list G401 of maintenance evaluations is displayed on the evaluation list screen G400 illustrated in FIG. 23. Accordingly, the maintenance worker can confirm maintenance evaluations that satisfy the specified display condition by a list. In addition, the list G401 of maintenance evaluation includes state icons G402.

A state icon G402 is displayed as an icon that depends on a maintenance evaluation. Accordingly, the maintenance worker can visually and easily confirm a maintenance evaluation.

As described above, the device management system 1 according to the embodiment can display a list of evaluations representing whether the maintenance work performed on the device 20 was adequate, on the terminal device 30. Accordingly, for example, the maintenance worker can confirm the list representing whether cause analysis in the maintenance work, and measures taken with respect to the cause were appropriate.

The present invention is not limited to the embodiments disclosed specifically as above, and various modifications, changes, and combinations are possible without deviating from the subject matters described in the claims.

RELATED-ART DOCUMENTS

Patent Documents

Patent Document 1: Japanese Unexamined Patent Application Publication No. H10-74108

The present application claims priority under 35 U.S.C. § 119 of Japanese Patent Application No. 2016-239770 filed on Dec. 9, 2016, the entire contents of which are hereby incorporated by reference.

What is claimed is:

1. An information processing apparatus, comprising:
a first hardware storage configured to store device data output from a device connected to the information processing apparatus;
a second hardware storage configured to store maintenance report data related to maintenance work performed on the device; and
a processor configured to:
evaluate whether the device on which the maintenance work was performed operates normally, based on the device data stored in the first hardware storage, and the maintenance report data stored in the second hardware storage, to generate an evaluation result, and
send a notice of the evaluation result, to a terminal connected to the information processing apparatus.

2. The information processing apparatus as claimed in claim 1, wherein the processor evaluates whether the device on which the maintenance work was performed has been operating normally for a predetermined number of days after the maintenance work was performed, based on the device data stored in the first hardware storage, and the maintenance report data stored in the second hardware storage.

3. The information processing apparatus as claimed in claim 2, wherein the first hardware storage stores the device data output daily from the device,
wherein the processor is further configured to daily execute an intermediate evaluation on whether an abnormality has occurred in the device on which the maintenance work was performed, based on the device data stored in the first hardware storage, and the maintenance report data stored in the second hardware storage, and
wherein in a case where the intermediate evaluations indicate that the abnormality has not occurred in the device for the predetermined number of days, the processor evaluates that the device on which the maintenance work was performed has been operating normally.

4. The information processing apparatus as claimed in claim 3, wherein the maintenance report data includes error information representing a cause of the maintenance work,
wherein upon executing the intermediate evaluation, the processor evaluates that the abnormality has occurred in the device in a case where the error information included in the maintenance report data is included in the device data output daily.

5. The information processing apparatus as claimed in claim 3, wherein in a case where a component installed in the device has been replaced in the maintenance work, the maintenance report data includes component information representing the replaced component,
wherein the device data includes a sensor value generated by a sensor monitoring a predetermined component installed in the device,
wherein upon executing the intermediate evaluation, the processor evaluates that the abnormality has occurred in the device in a case where the sensor value included in the device data output daily, and generated by the sensor monitoring the component represented by the component information included in the maintenance report data, does not converge on a predetermined value.

6. The information processing apparatus as claimed in claim 1, further comprising:
a third hardware storage configured to store maintenance evaluation data representing the evaluation result,
wherein the processor is further configured to:
obtain, in response to receiving an obtainment request for an evaluation list from the terminal, one or more items of the maintenance evaluation data corresponding to the obtainment request among items of the maintenance evaluation data stored in the third hardware storage, and
cause the terminal to display, as a list, the evaluation result represented by the obtained items of the maintenance evaluation data.

7. An information processing method executed by a computer, wherein the computer includes a first hardware storage configured to store device data output from a device; and a second hardware storage configured to store maintenance report data related to maintenance work performed on the device, the information processing method comprising:
evaluating whether the device on which the maintenance work was performed operates normally, based on the device data stored in the first hardware storage, and the maintenance report data stored in the second hardware storage, to generate an evaluation result, and
sending a notice of the evaluation result obtained by the evaluating, to a terminal.

8. A non-transitory computer-readable recording medium having a program stored therein for causing a computer to execute a process, wherein the computer includes a first hardware storage configured to store device data output from a device; and a second hardware storage configured to store maintenance report data related to maintenance work performed on the device, the process comprising:
evaluating whether the device on which the maintenance work was performed operates normally, based on the device data stored in the first hardware storage, and the maintenance report data stored in the second hardware storage, to generate an evaluation result, and
sending a notice of the evaluation result obtained by the evaluating, to a terminal.

* * * * *